United States Patent [19]
Kobayashi

[11] 3,885,354
[45] May 27, 1975

[54] AUTOMATIC RECIPRO FINISHING MACHINE

[75] Inventor: Hisamine Kobayashi, Nagoya, Japan

[73] Assignee: Shikishima Tipton Mfg. Co., Ltd., Nagoya, Japan

[22] Filed: Aug. 20, 1973

[21] Appl. No.: 389,515

[30] Foreign Application Priority Data
Dec. 20, 1972 Japan.............................. 47-128425
Aug. 18, 1972 Japan.............................. 47-96539
Aug. 23, 1972 Japan.............................. 47-98219

[52] U.S. Cl................... 51/7; 51/215 CP; 51/215 E
[51] Int. Cl....................... B24b 31/00; B24b 51/00
[58] Field of Search........ 51/7, 5 R, 215 R, 215 CP, 51/215 E, 317-318

[56] References Cited
UNITED STATES PATENTS
2,815,609 12/1967 Von der Lindon.................... 51/7
2,867,058 1/1969 Balsiger...................... 51/215 CP X Primary Examiner—Donald G. Kelly
Attorney, Agent, or Firm—Wenderoth, Lind & Ponack

[57] ABSTRACT

An automatic recipro-finishing machine includes structure for conveying workpieces or workpiece holders, structure for engaging and disengaging the conveying structure with and from a conveying chain and structure for transferring the workpieces or workpiece holders from the conveying structure to the finishing apparatus or from the finishing apparatus to the conveying structure, together with the provision of a sequence control system for conveying the workpieces or workpiece holders, for mounting workpieces or the workpiece holders in the finishing apparatus, and for chucking and removal of the workpiece or the workpiece holders from the finishing apparatus.

6 Claims, 37 Drawing Figures

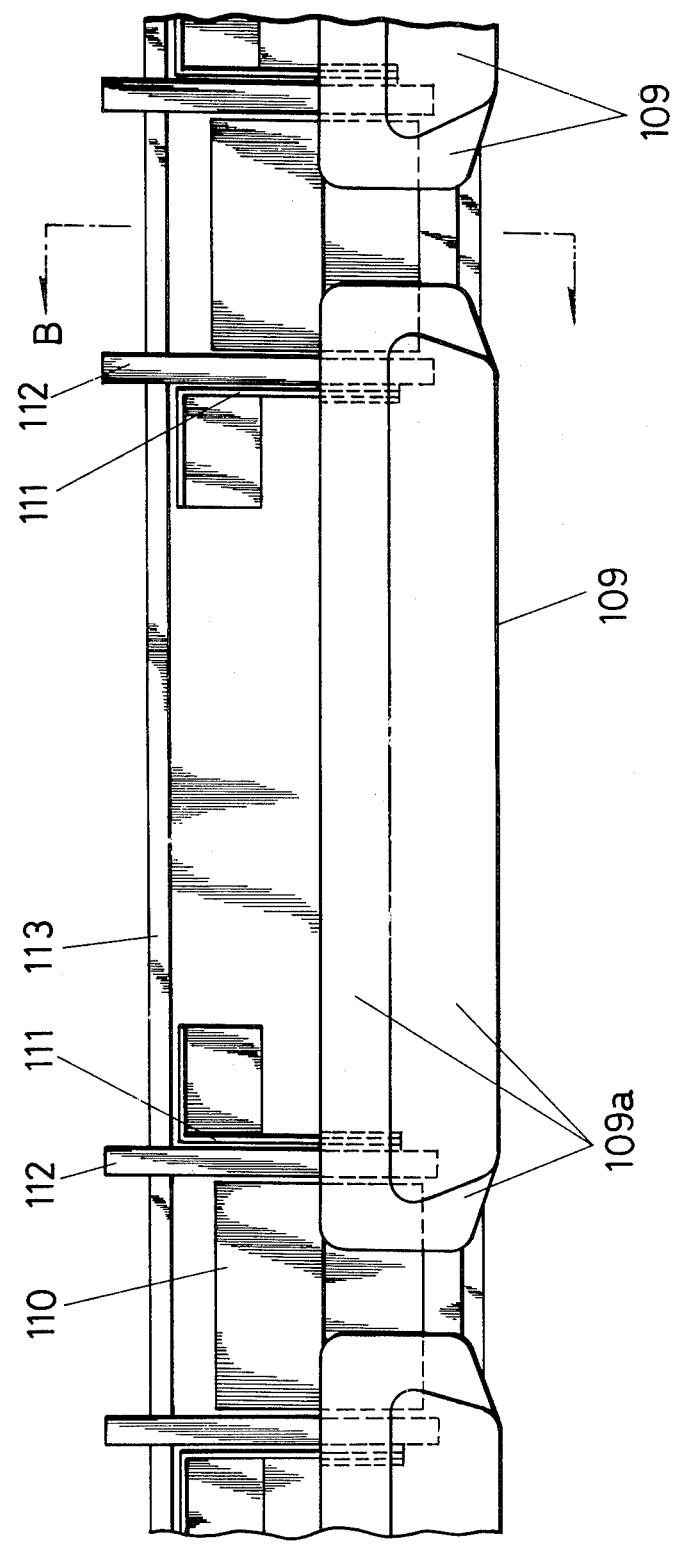

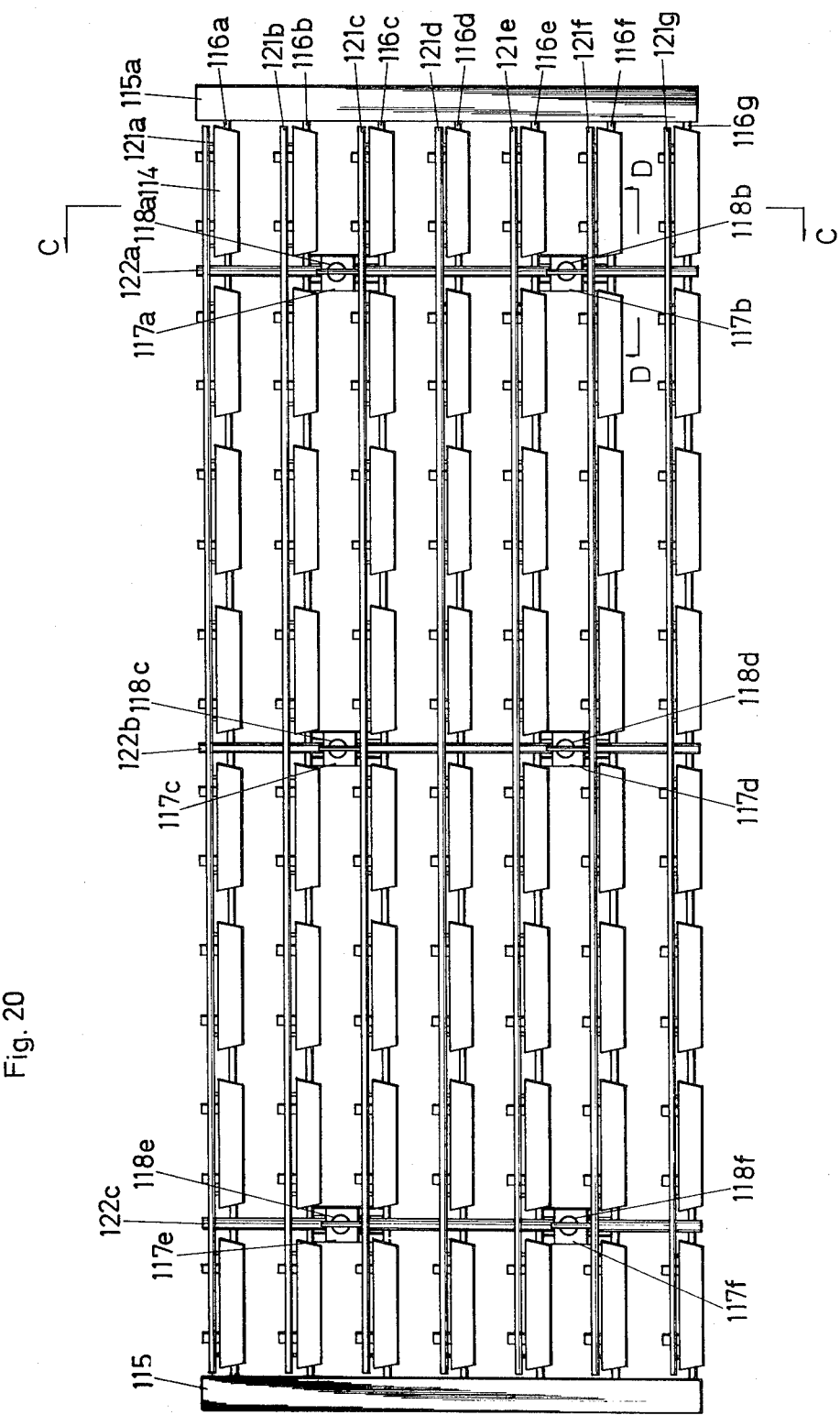

AUTOMATIC RECIPRO FINISHING MACHINE

BACKGROUND OF THE INVENTION

This invention relates to an automatic reciprofinishing machine, in which attachment and removal of workpieces or workpiece holders containing a plurality of workpieces (hereinafter referred to as workpieces) and conveying of workpieces are all automatically carried out, and workpieces are also automatically caused to reciprocate in an abrasive trough so that they may be subjected to a finishing process.

Because of its high finishing efficiency, a conventional finishing machine of this type heretofore has been used extensively, but it has disadvantages in that great amounts of human labor and time are required for attaching and removing workpieces to and from the finishing apparatus.

One object of the present invention is to provide full automatic operations of such attachment and removal of workpieces as well as an automatic finishing operation.

Another object of the invention is to provide an automatically engageable and disengageable workpiece carrier and conveying chain. All these operations and subsequent operations of washing and drying finished workpieces are performed in a previously programmed sequence.

Still another object of the invention is to minimize the necessity for human labor by providing a fully automatic finishing machine.

SUMMARY OF THE INVENTION

According to the invention, there are provided a loop or annular passage for conveying workpieces, and a finishing trough, holder transfer means and after-treatment means arranged along this loop passage, the operations of these means being fully automated in a predetermined sequence.

The finishing apparatus is provided at a central portion of the loop passage having a predetermined length. A workpiece transfer means is also provided on the loop passage on opposite sides of the finishing apparatus, and also a workpiece washing means, anticorrosive treatment means and blowing means are provided on the loop passage. The loop passage may consist of a substantially rectangular guide and an endless chain provided therealong. The finishing apparatus supports an abrasive or finishing trough filled with abrasive chips and capable of vertical movement and means for horizontally reciprocating workpieces in the abrasive trough. The vertical movement of the abrasive trough may be achieved by utilizing fluid pressure or other known means such as a chain or a vertical rod. The means for horizontally reciprocating workpieces may be any known means for reciprocating a support frame supporting workpieces along a guide shaft or reciprocating a shaft to which such support frame is secured. For the power transmission mechanism for generating the reciprocating movement, a crank means or any other known reciprocating drive force may be utilized. The transfer means for transferring workpieces to and from the finishing apparatus may consist of a workpiece loading means and a workpiece unloading means, both means being provided on opposite sides of the finishing apparatus and on the conveying passage. The workpieces on the conveying passage on the loading side are transferred to the finishing trough for finishing therein, then transferred to the conveying passage on the unloading side, and returned to a workpiece carrier. The chain of the conveying means is passed around chain wheels provided at suitable positions, and at least one chain wheel constitutes a driving wheel. The driving wheel is coupled through speed change means to a motor. The purpose of the chain is to convey the workpiece carrier, and it may be replaced with other suitable means such as a wire or belt. With different conveying means different means may be used for engaging and disengaging the workpiece carrier. The workpiece carrier moves along the conveying guide, and usually two or three carriers are sufficient, but it is of course possible to provide a greater number of carriers. A carrier stop means and workpiece transfer means are provided at the carrier stop position, and it is so adapted that the carrier is disengaged from the chain and is stopped at a predetermined position by a stopper means.

This invention also provides a novel holder structure for facilitating the loading and unloading of workpieces. The holder has workpiece attachment bases arranged parallel to the driving direction within a workpiece attachment base frame. Workpiece fixing blocks and plate springs are provided such as to clamp workpieces therebetween with the finishing surfaces of the workpieces directed upwardly.

In another holder structure, workpiece bases, brackets and fixing rod guides are secured to workpiece frames. In this example, fixing rods are provided such that they are in contact with legs of the mounted workpieces. The fixing rods are provided with projections formed with holes, through which rods extend into the interior of the brackets. The workpieces are fixed by fixing screws provided on top of the brackets and keep rods.

As described above, this invention provides a fully automatic finishing machine, in which all the operations including conveying and stopping of workpieces, transferring of workpieces to and from the finishing apparatus, and finishing as well as other subsequent treatments of workpieces are sequentially controlled by a control system, except the operations of setting and removing of workpieces to and from the workpiece carrier which alone involve human labor.

BRIEF DESCRIPTION OF THE DRAWINGS

FIG. 18 shows, on an enlarged scale, part of FIG. 17.

FIG. 20 is a plan view, on an enlarged scale, showing another example of the holder.

201: Power On,
202: Ready to Start,
203: Conveying Chain,
204: Workpiece Setting (Remove),
205: Start,
206: Workpiece Setting Position,
207: Carrier Stopper Out,
208: Carrier Moves Forward,
209: Withdraw Workpiece Transfer Means,
210: Dwelling,
211: Clamp Workpiece,
212: Return Workpiece Transfer Means,
213: Reciprocate, timer,
214: Positioning Workpieces,
215: Abrasive Trough Up,
216: Same Down,
217: Unloading Workpieces,
218: Carrier Stopper Out at Loading Position,
219: Carrier Moves Forward,
220: Confirm Passage of Carrier by Limit Switch,
221: Carrier Stopper on at Workpiece Setting Position,
222: Carrier Stopper Out at Unloading Position,
223: Carrier Moves Forward,
224: Wash by Steam,
225: Wash by Water,
226: Anticorrosive Treatment, and
227: Carrier Stopper Out at Workpiece Setting Position.

Figure 31:
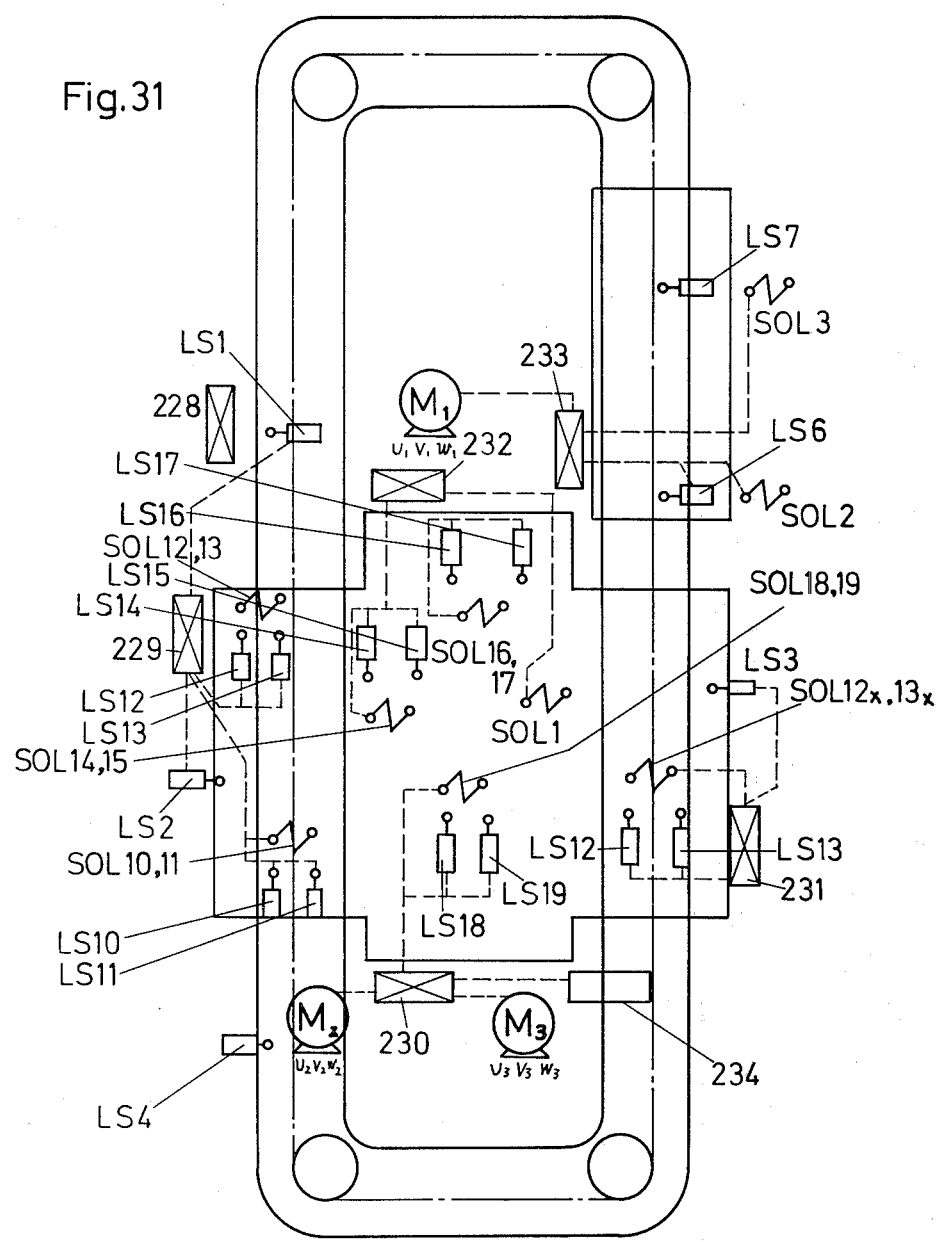

FIG. 31 shows positions of limit switches, etc., in which reference numerals denote as follows, respectively:

228: Operator's Panel,
229 thru 233: Switch Boxes, and
234: Magnetic Switch.

Figure 32:
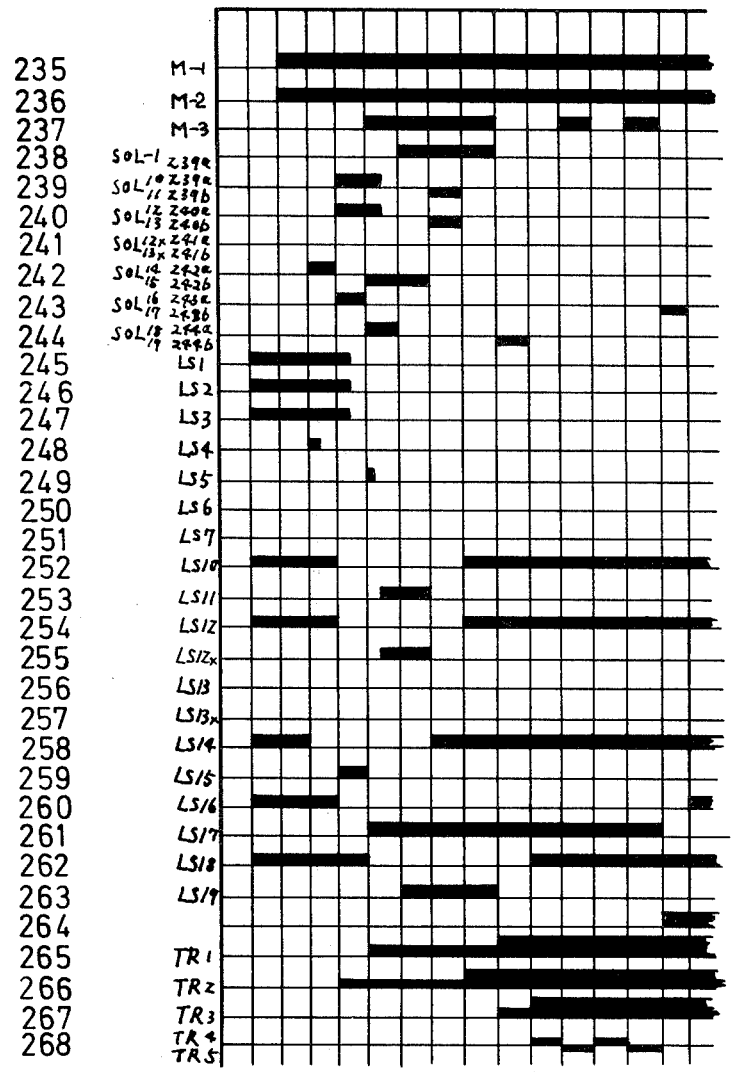
Figure 33:
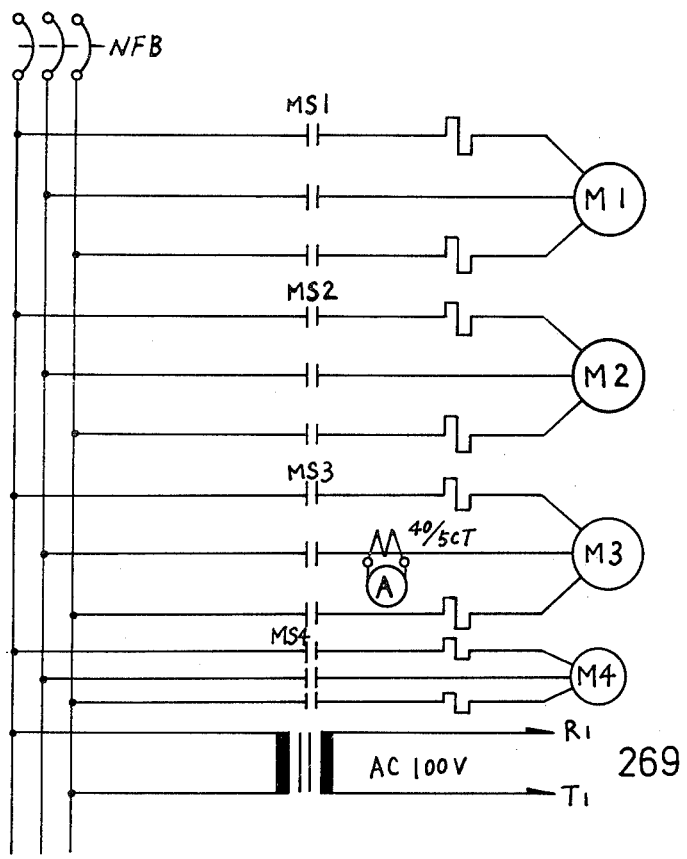
Figure 34:
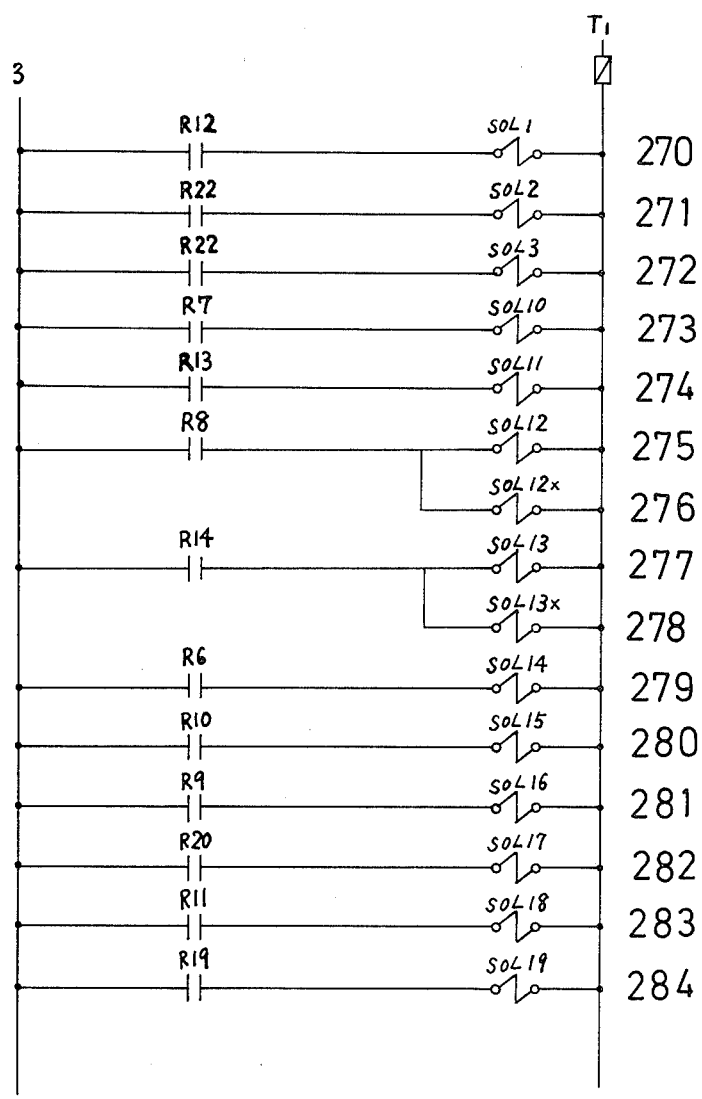
Figure 35:
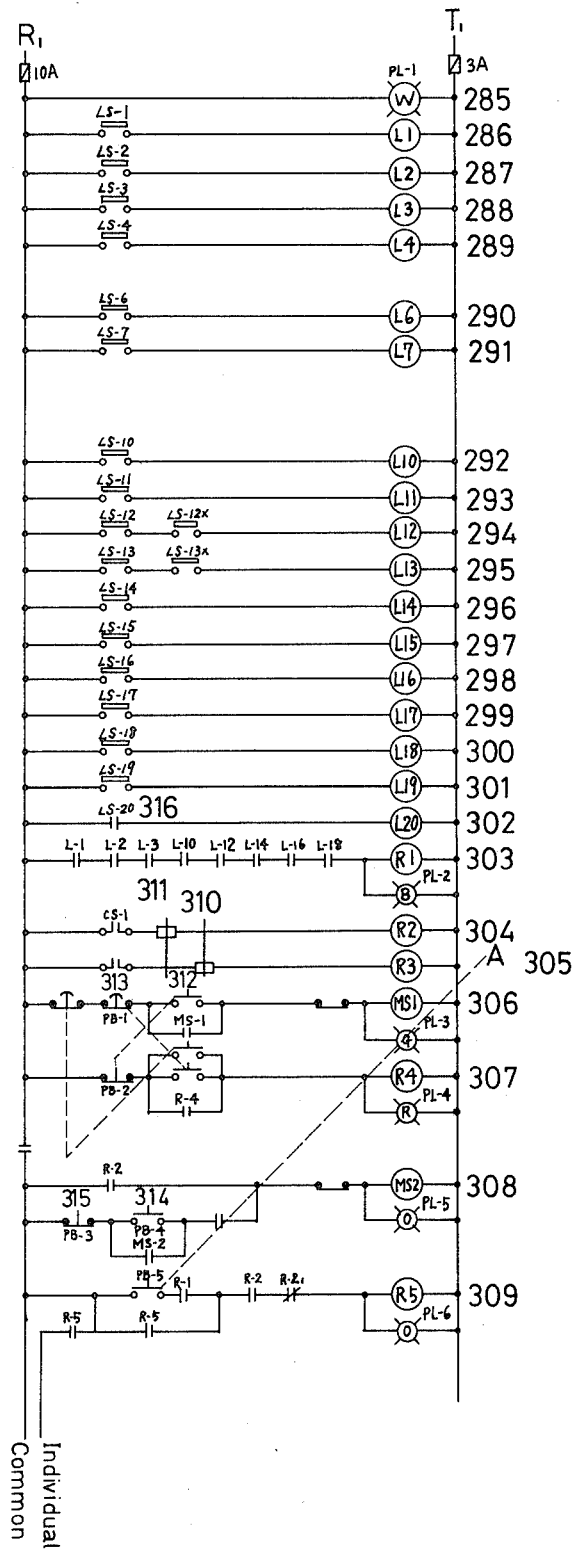
Figure 35A:
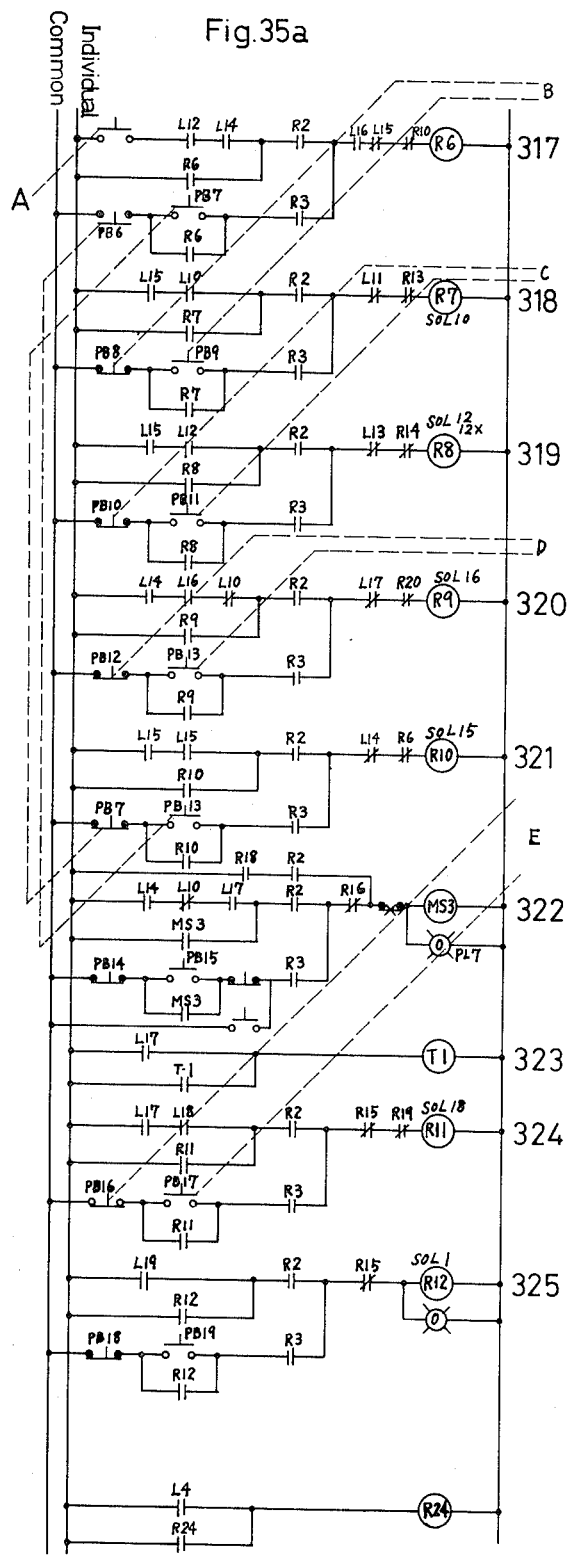
Figure 35B:
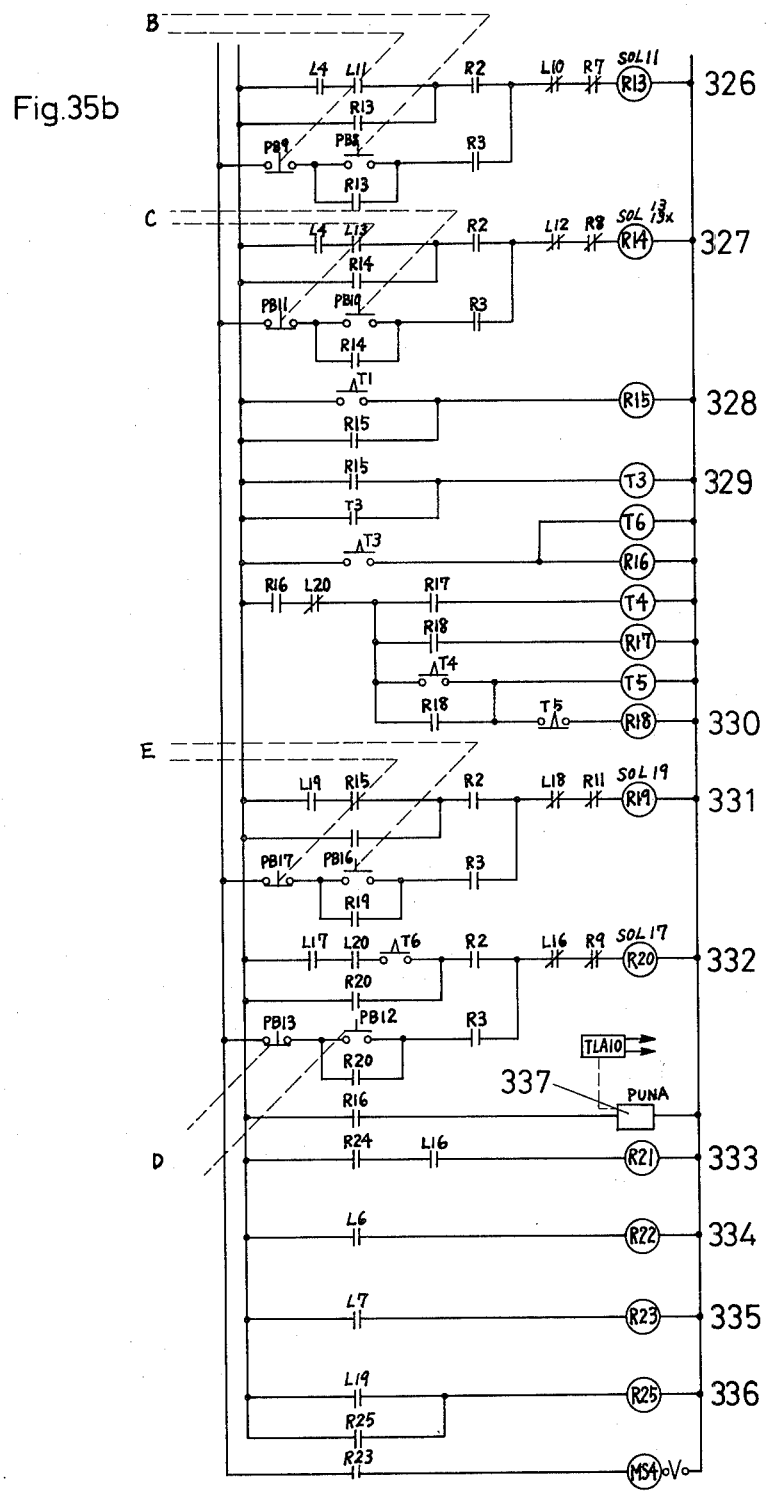

FIG. 32 is a sequence diagram or timing chart of the programmed operations of the device of the invention, in which reference numerals denote as follows, respectively:

235: Hydraulic Pressure,
236: Chain for Conveying Means,
237: Reciprocate,
238: Compounds,
239: Carrier Stopper at Workpiece Setting Position,
239a: Same Out,
239b: Same In,
240: Carrier Stopper at Loading Position,
240a: Same Out,
240b: Same In,
241: Carrier Stopper at Unloading Position,
241a: Same Out,
241b: Same In,
242: Workpiece Transfer Means,
242a: Withdraw Same,
242b: Return Same,
243: Clamp Device,
243a: Tighten Same,
243b: Loosen Same,
244: Abrasive Trough Movement,
244a: Same Up,
244b: Same Down,
245: Workpiece Initial Position,
246: Carrier at Loading Position,
247: Carrier at Unloading Position,
248: Confirm Workpiece Loaded,
249: Confirm Workpiece Unloaded,
250: Start Washing by Water,
251: Steam In,
252: Workpiece Positioning Stopper In,
253: Same OUt,
254: Carrier Stopper at Loading Position In,
255: Same Out,
256: Carrier Stopper at Unloading Position In,
257: Same Out,
258: Return Workpiece Transfer Means,
259: Withdraw Same,
260: Loosen Clamp Device,
261: Tighten Same,
262: Abrasive Trough Down,
263: Same Up
264: Magnetic Switch,
265: Timer for Finishing Time,
267: Timer for Carrier Stopper, and
268: Timer for Positioning FIG. 33 is a circuit diagram of drive motors which may be used in the present invention, in which reference numerals denote as follows, respectively:

M1: Motor for Hydraulic System, 3.7 kw
M2: Motor for Conveying System, 1.5 kw
M3: Motor for Reciprocating Motion, 5.5 kw,
M4: Motor for Anticorrosive Treatment Pump, 0.75 kw, and
269: Control Circuit FIG. 34 is a circuit diagram of solenoid system which may be used in the present invention, in which reference numerals denote as follows, respectively:
- 270: Compounds,
- 271: Water,
- 272: Steam,
- 273: Workpiece Setting Position Stopper Out,
- 274: Same In,
- 275: Carrier Stopper at Loading Position Out,
- 276: Carrier Stopper at Unloading Position Out,
- 277: Carrier Stopper at Loading Position In,
- 278: Carrier Stopper at Unloading Position In,
- 279: Withdraw Workpiece Transfer Means,
- 280: Return Same,
- 281: Tighten Clamp Device,
- 282: Loosen Same,
- 283: Abrasive Trough Up, and
- 284: Same Down FIGS. 35, 35a and 35b, as combined, are a circuit diagram of a sequentially programmed control system which may be used in the present invention, in which reference numerals denote as follows, respectively:
- 285: Power Supply,
- 286: Workpiece Setting Initial Position,
- 287: Confirm Carrier at Loading Position,
- 288: Confirm Carrier at Unloading Position,
- 289: Confirm Workpiece at Unloading Position,
- 290: Start Washing Means,
- 291: Start Steam Blower,
- 292: Setting Position Stopper In,
- 293: Same Out,
- 294: Carrier Stopper In,
- 295: Same Out,
- 296: Return Workpiece Transfer Means,
- 297: Withdraw Same,
- 298: Loosen Workpiece Clamp Device,
- 299: Tighten Same,
- 300: Abrasive Trough Down,
- 301: Same Up,
- 302: Micro Switch On,
- 303: Confirm Initial Position,
- 304: Automatic,
- 305: Manual,
- 306: Hydraulic Motor, 13.7 kw,
- 307: Emergency Stop,
- 308: Conveyor, 1.5 kw,
- 309: Automatic Start,
- 310: Automatic,
- 311: Manual,
- 312: Ready to Start,
- 313: Emergency Stop,
- 314: Start Conveyor,
- 315: Stop
- 317: Withdraw Workpiece Transfer Means,
- 318: Workpiece Setting Position Stopper Out,
- 319: Carrier Stopper Out,
- 320: Tighten Clamp Device,
- 321: Return Workpiece Transfer Means,
- 322: Motor, 5.5 kw,
- 323: Reciprocating Motion,
- 324: Abrasive Trough Up,
- 325: Compounds,
- 326: Workpiece Setting Position Stopper In,
- 327: Carrier Stopper In,
- 328: Abrasive Trough Down,
- 329: Stop Reciprocating Motion,
- 330: Start Inching Abrasive Trough,
- 331: Abrasive Trough Down,
- 332: Loosen Clamp Device,
- 333: Finishing Operation Completed,
- 334: Wash Finished Workpiece,
- 335: Steam Blow Same
- 336: Abrasive Trough Up (Memory).

DETAILED DESCRIPTION OF THE INVENTION

Figure 1:
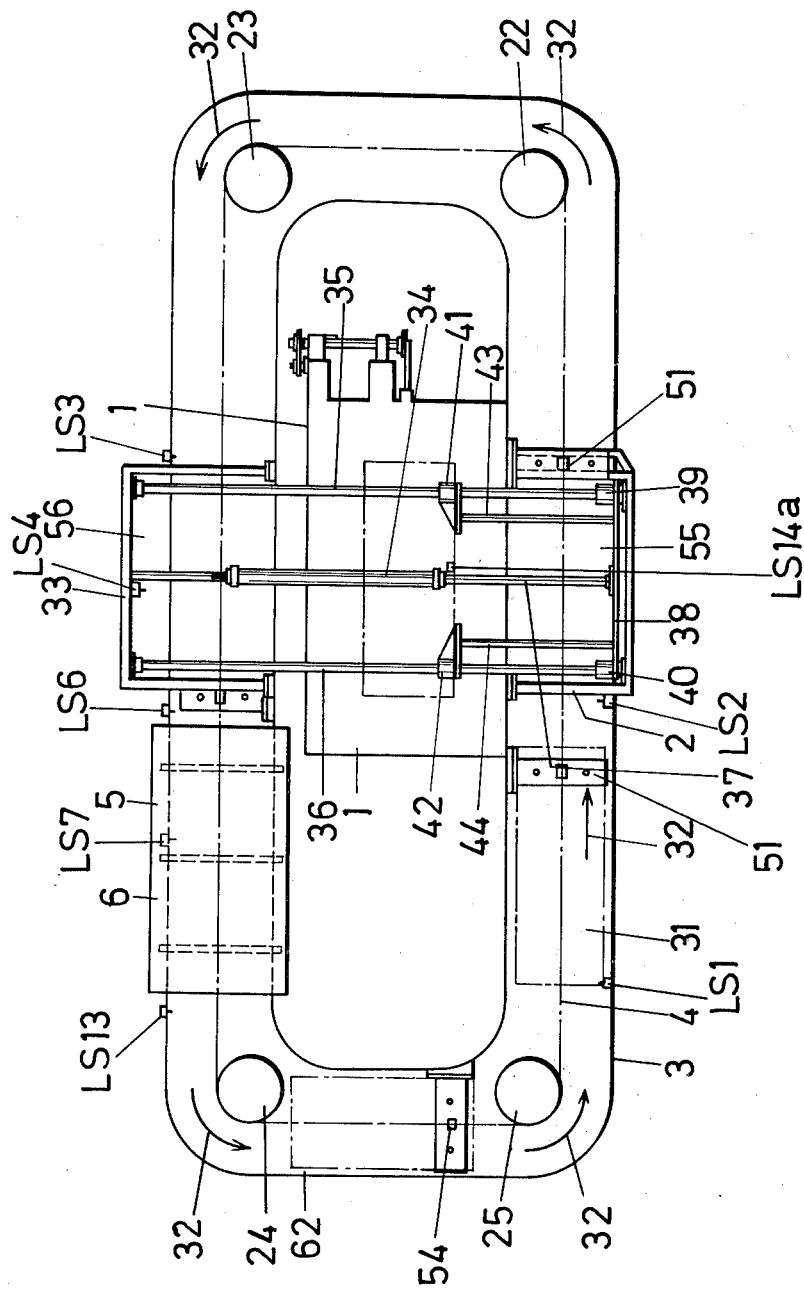
FIG. 1 is a plan view of one preferred embodiment of the invention.
Figure 2:
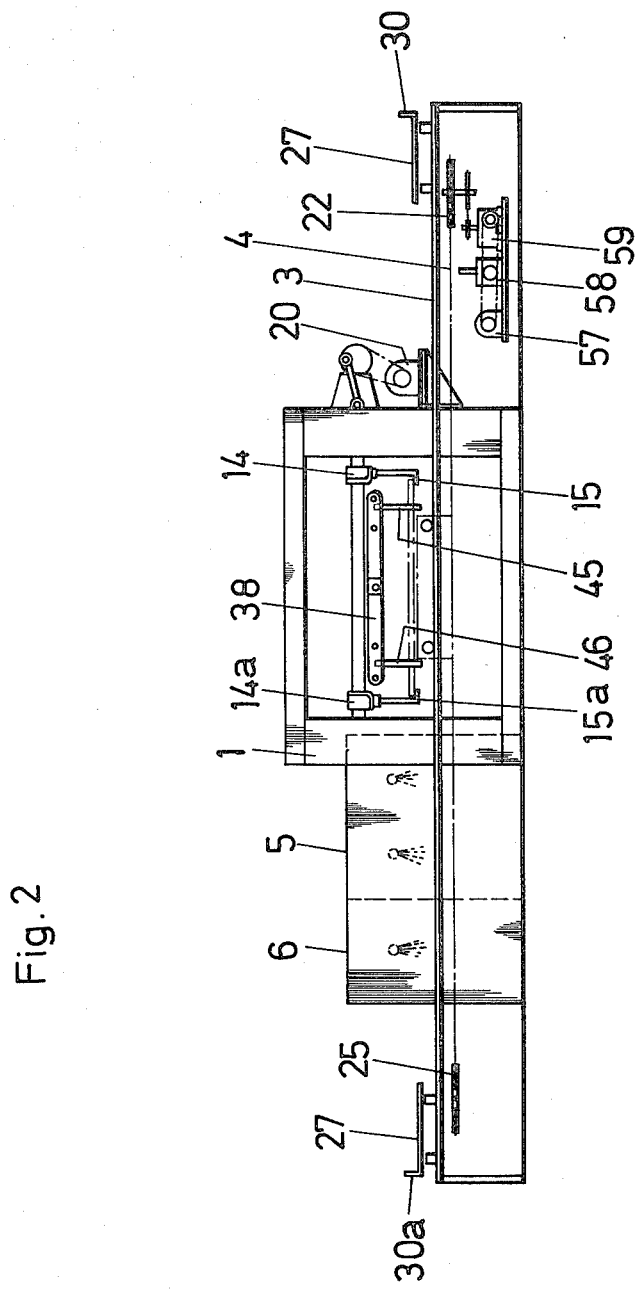
FIG. 2 is a front view of the same.

The invention will now be described in connection with the accompanying drawings. Referring to FIGS. 1 and 2, reference numeral 1 denotes a finishing apparatus, the details of the construction of which will be described hereinafter. Numeral 2 denotes a transfer means for transferring a workpiece holder carrying a number of workpieces to and from the finishing machine. Numeral 3 denotes a guide, numeral 4 a guided conveyor chain, numeral 5 a washing means, and numeral 6 a blowing or drying means. Along the guide 3 are a workpiece supply position 31 and a workpiece removing position 62.

Figure 4:
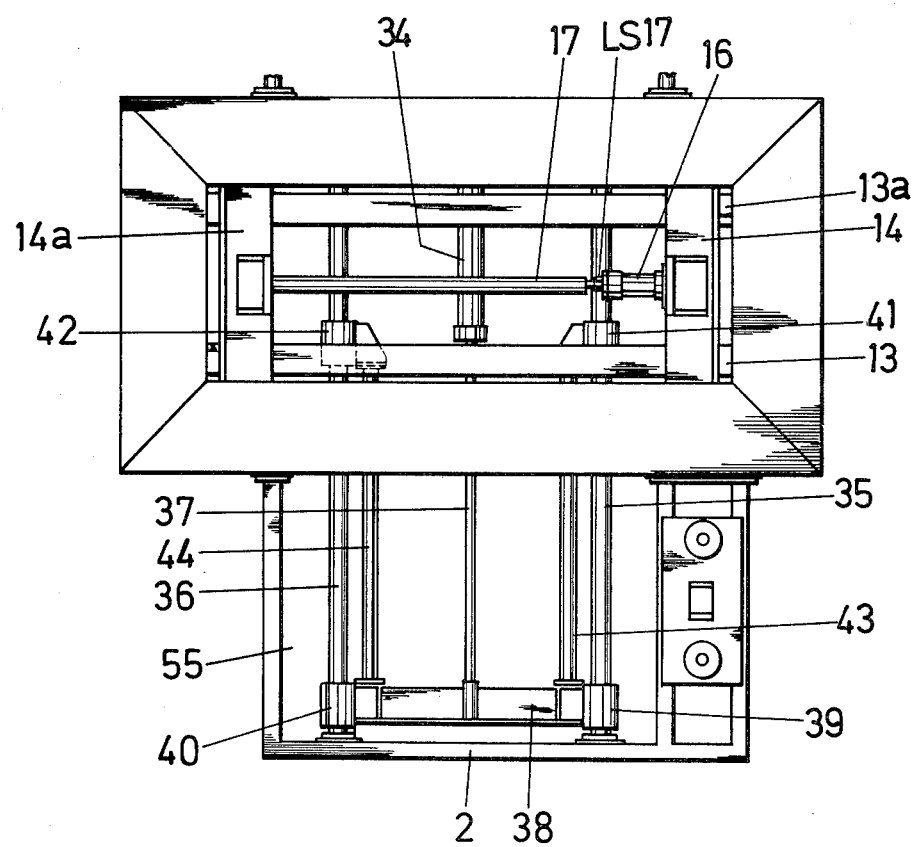
FIG. 4 is a plan view, on an enlarged scale, of a workpiece loading means.
Figure 5:
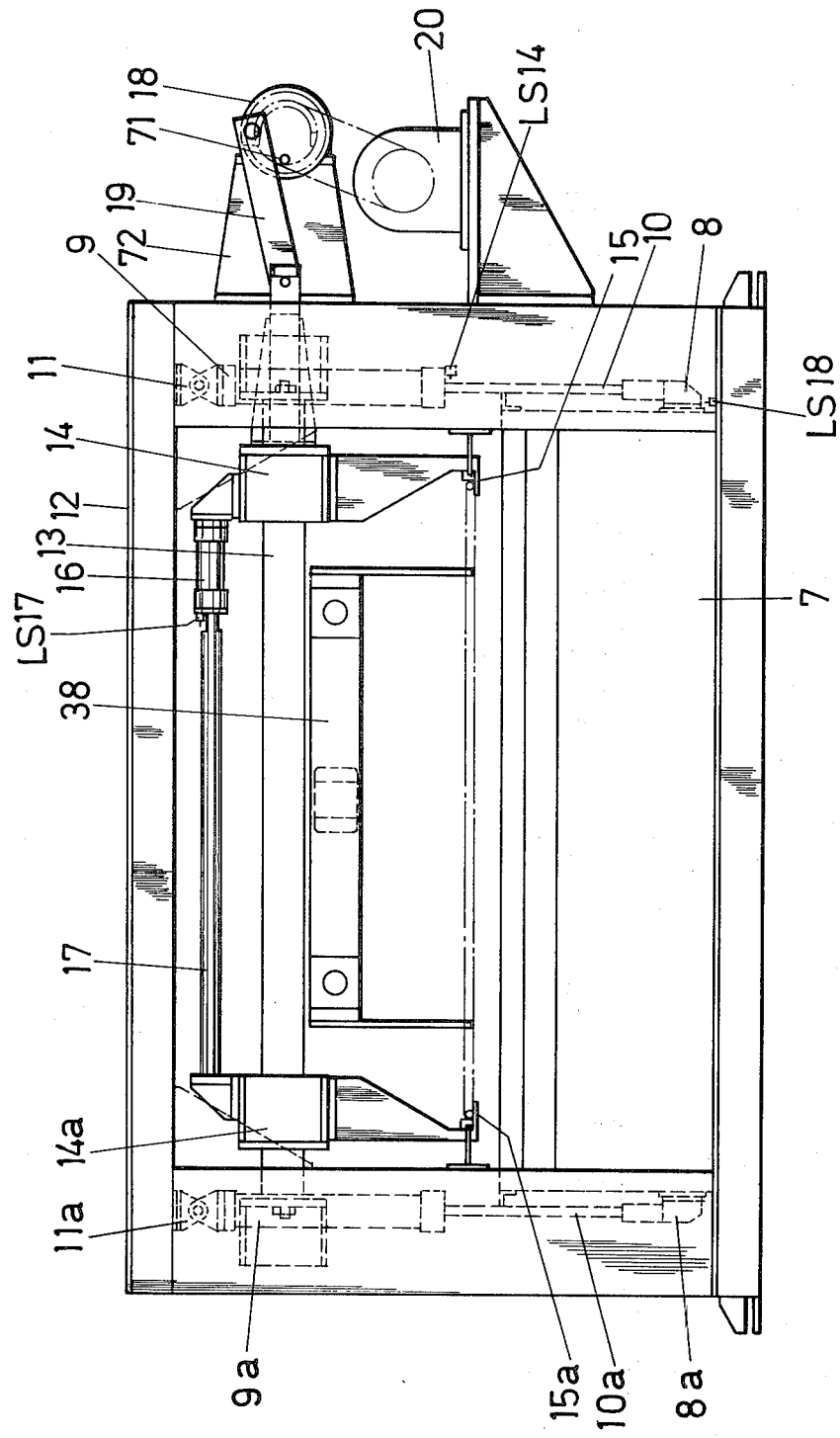
FIG. 5 is a front view, on an enlarged scale, of the same.
Figure 6:
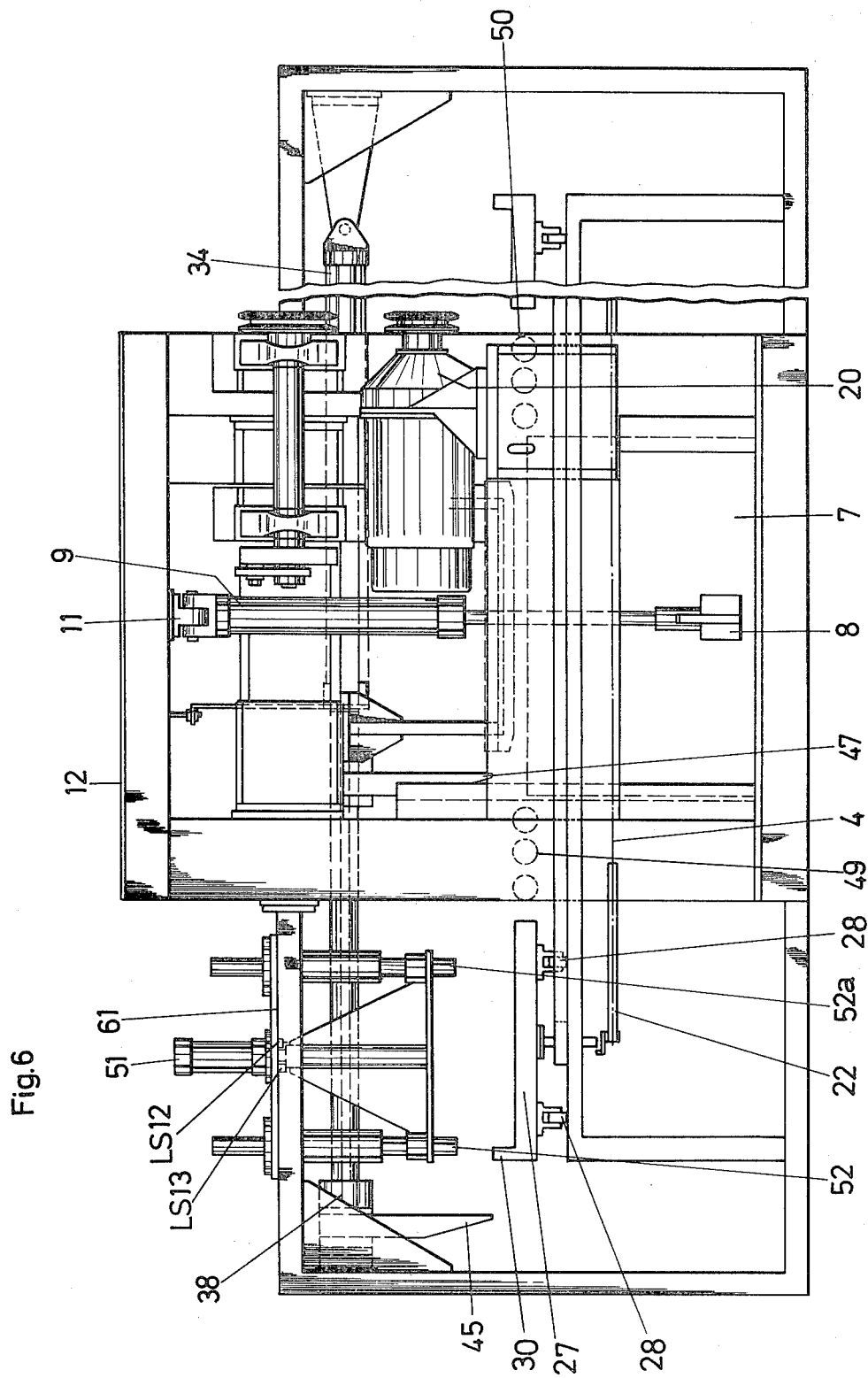
FIG. 6 is a side view, on an enlarged scale, of a workpiece loading means and a finishing apparatus.

The construction of the finishing apparatus is shown in more detail in FIGS. 4, 5 and 6. In these figures, numeral 7 denotes an abrasive or finishing trough in the form of a rectangular box filled with abrasive chips. The abrasive chips used may be of the dry type or a wet type incorporated in a compound or water. Secured to opposite sides of the abrasive trough are flanges 8 and 8a coupled to ends of piston rods 10 and 10a of fluid pressure cylinders (either hydraulic or pneumatic cylinders) 9 and 9a. The upper ends of the fluid cylinders 9 and 9a are coupled to upper flanges 11 and 11a secured to the underside of the top wall of the frame 12. Shafts 13 and 13a are secured between the opposite sides of the frame 12, and saddles 14 and 14a are slidably mounted on the shafts 13 and 13a. The saddles have lower extensions having hook-shaped ends 15 and 15a. Secured to the top of one saddle 14 is a fluid pressure cylinder 16 the piston rod 17 of which is secured to the top of the other saddle 14a. The rotation of a motor 20 is transmitted through a cam wheel 18 and a crank 19 to the saddle 14 for causing reciprocating movement thereof.

Figure 3:
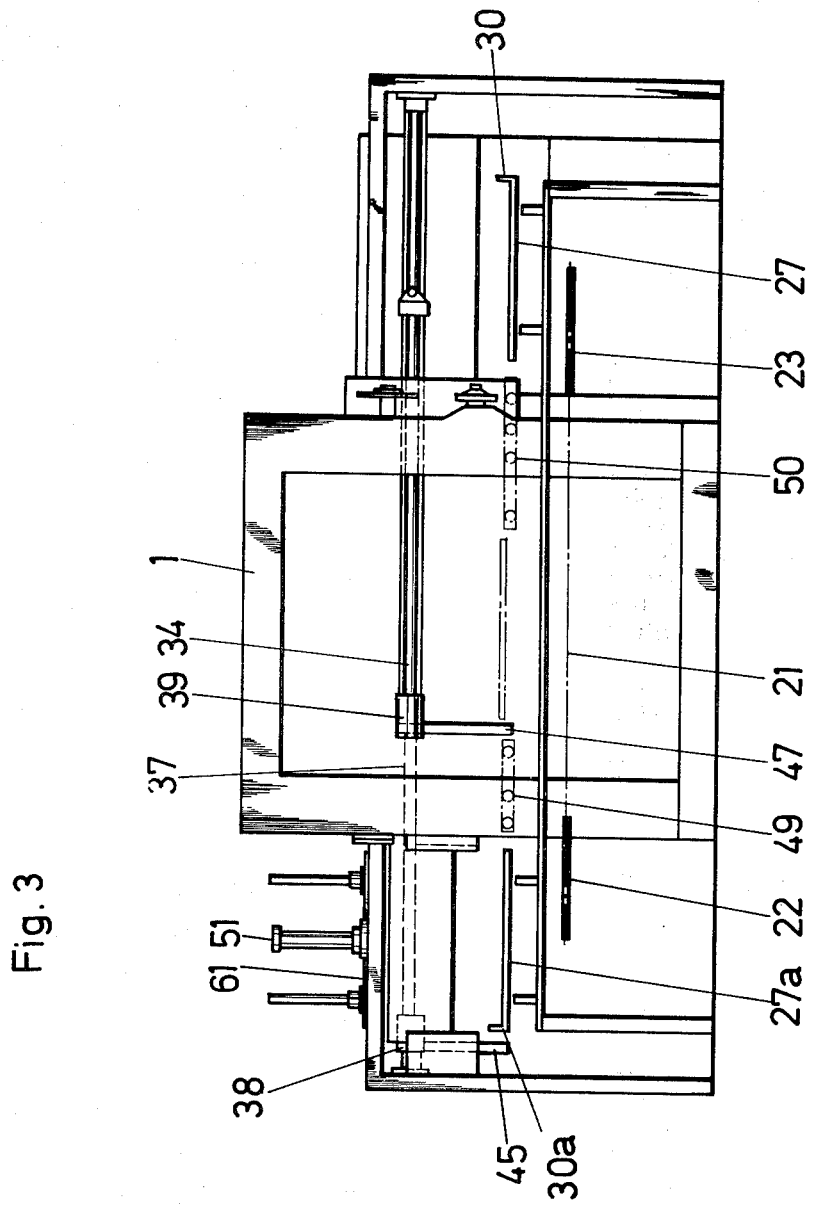
FIG. 3 is a side view, on an enlarged scale, of the same.

The detailed construction of the means for transferring workpieces to and from the finishing apparatus is shown in FIGS. 4, 5 and 6, and its relation to whole machine is shown in FIGS. 1, 2 and 3. The workpiece transfer means has a frame 33 extending between a workpiece loading position 55 and an unloading position 56, these positions being on opposite sides of the finishing apparatus. It also has a central fluid cylinder 34 and shafts 35 and 36 on opposite sides thereof. The shafts 35 and 36 extend to and are secured to the frames 12 and 33. The fluid cylinder 34 has a piston rod 37 extending to and secured to a workpiece feed means 38. The workpiece feed means are supported on both sides with sliding pieces 39, 40, 41 and 42 which are capable of sliding on the shafts 35 and 36, and the sliding pieces 39 and 41 are connected by the shaft 43, and the pieces 40 and 42 are connected by the shaft 44. Workpiece feed pawls 45, 46, 47 and 48 extend downwardly from the respective sliding pieces 39, 40, 41 and 42. The workpiece feed pawls 47 and 48 are capable of rotation in the counterclockwise direction from their vertical position in FIG. 3, but are prevented from rotating in the opposite direction. Also, if they are rotated in the counterclockwise direction, they are adapted to be returned to the vertical position by the action of springs.

A number of guide rollers 49 and 50 for guiding the workpieces are provided in front of and on opposite sides of the abrasive trough, and they are rotatable about their shafts mounted in the frame.

The endless conveyor chain 4 is passed around chain wheels 22, 23, 24 and 25 as shown in FIG. 1. One of these chain wheels is a driving wheel, and the rotation of a low speed motor 57, seen in FIG. 2, is transmitted to this driving wheel through a stepless speed-change pulley 58 and a reduction means 59.

Figure 7:
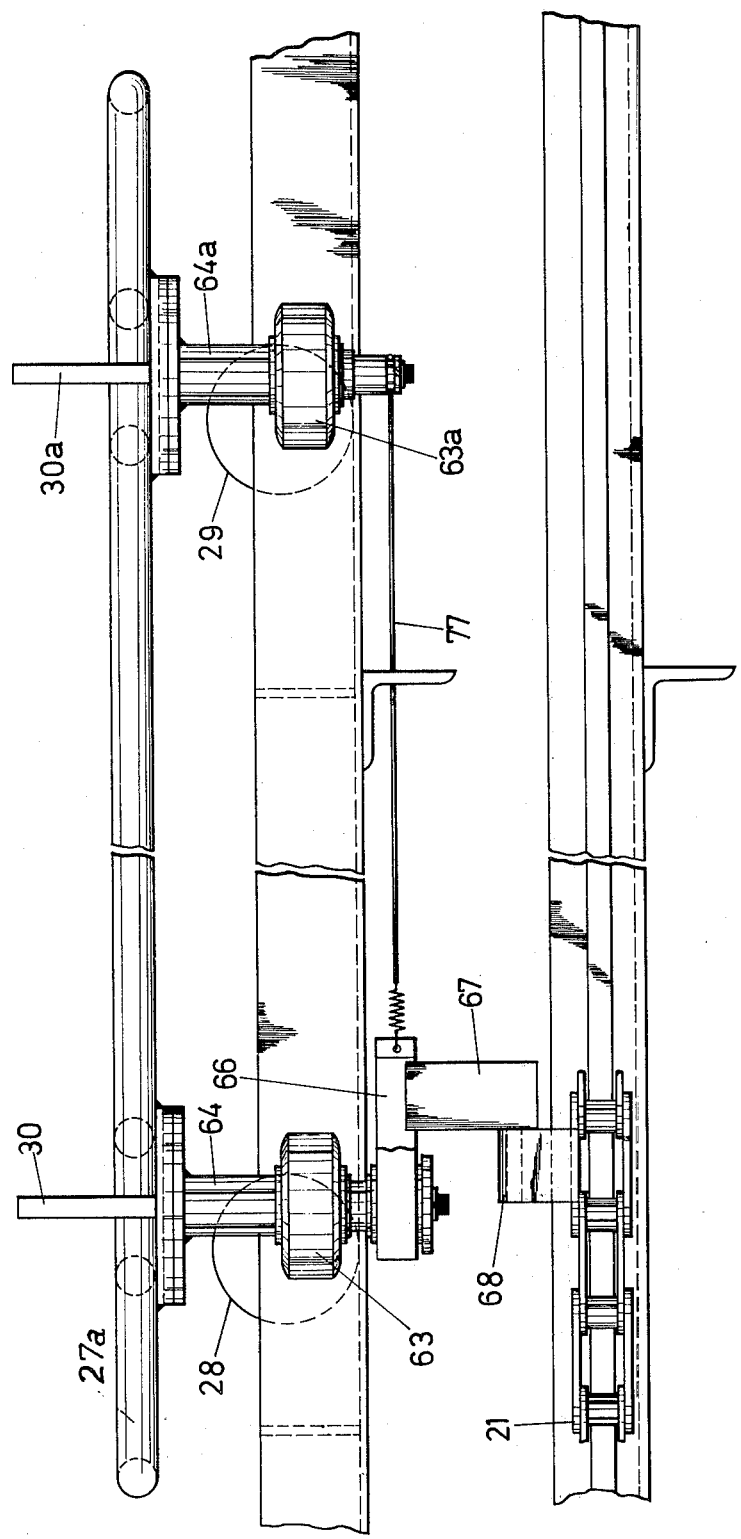
FIG. 7 is a front view, on an enlarged scale, of the state of the connection between a workpiece carrier and a chain.
Figure 8:
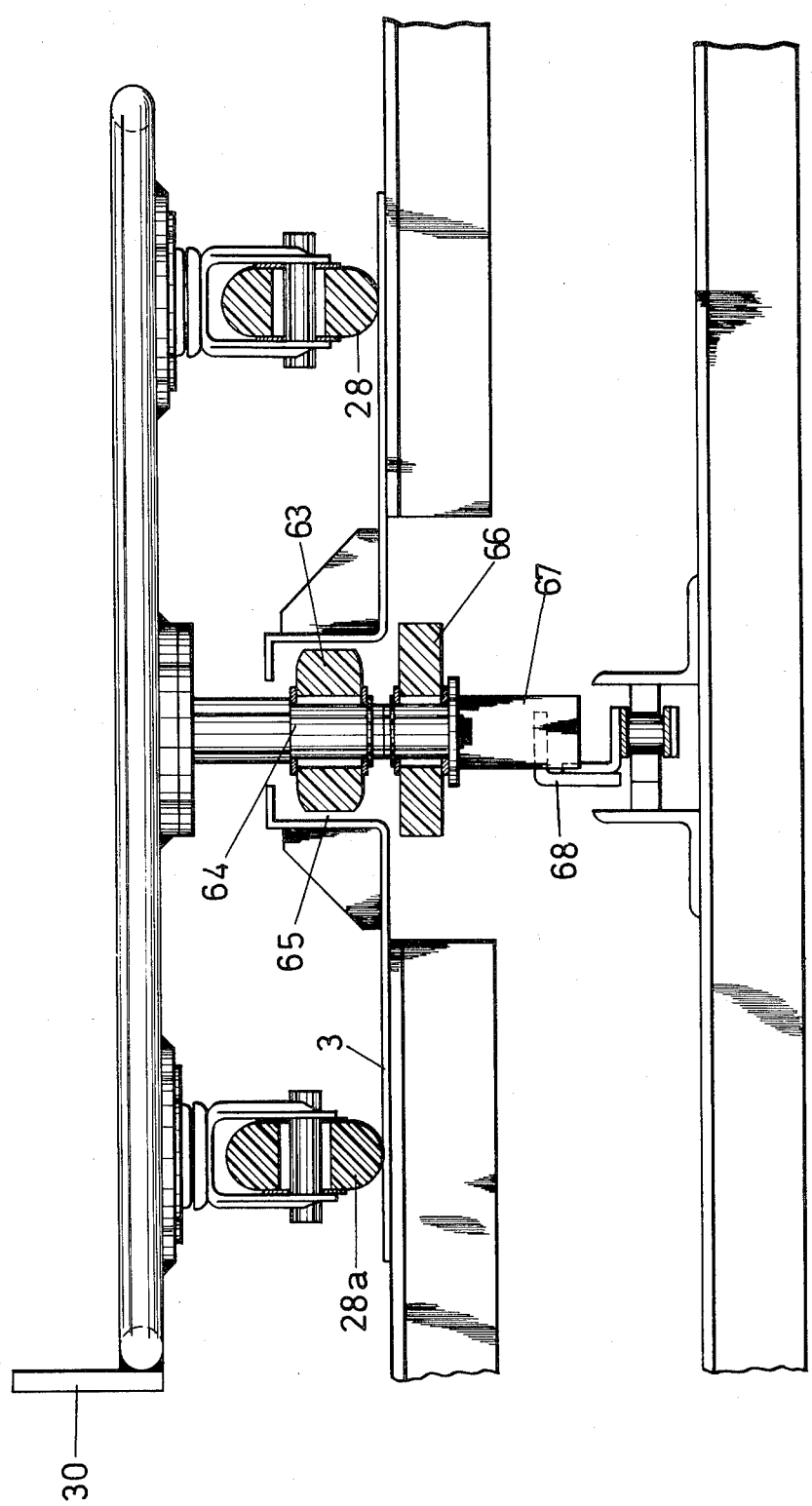
FIG. 8 is a transverse sectional view of the same.
Figure 9:
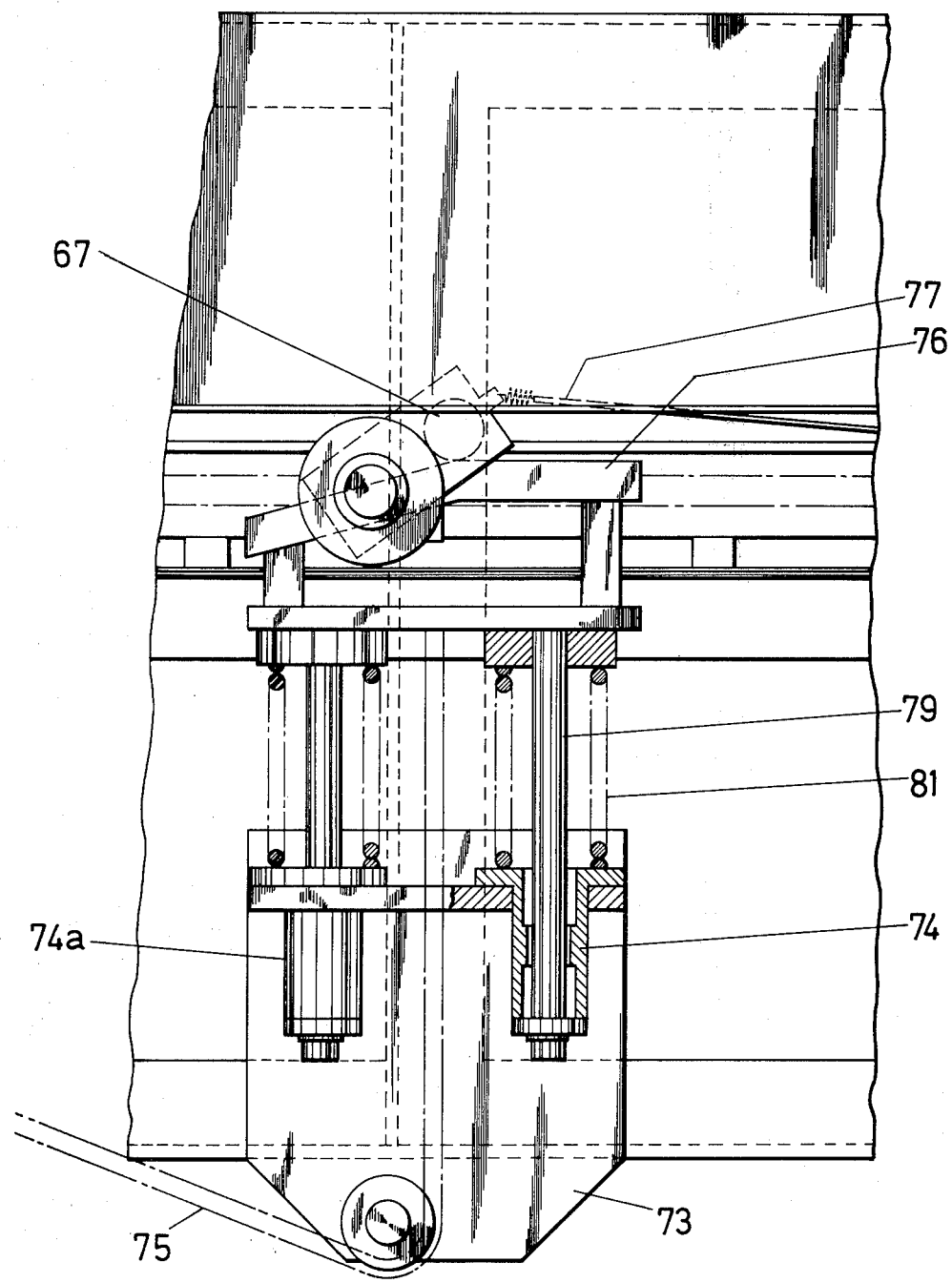
FIG. 9 is a plan view, on an enlarged scale, showing the carrier and the chain disengaged from each other.
Figure 10:
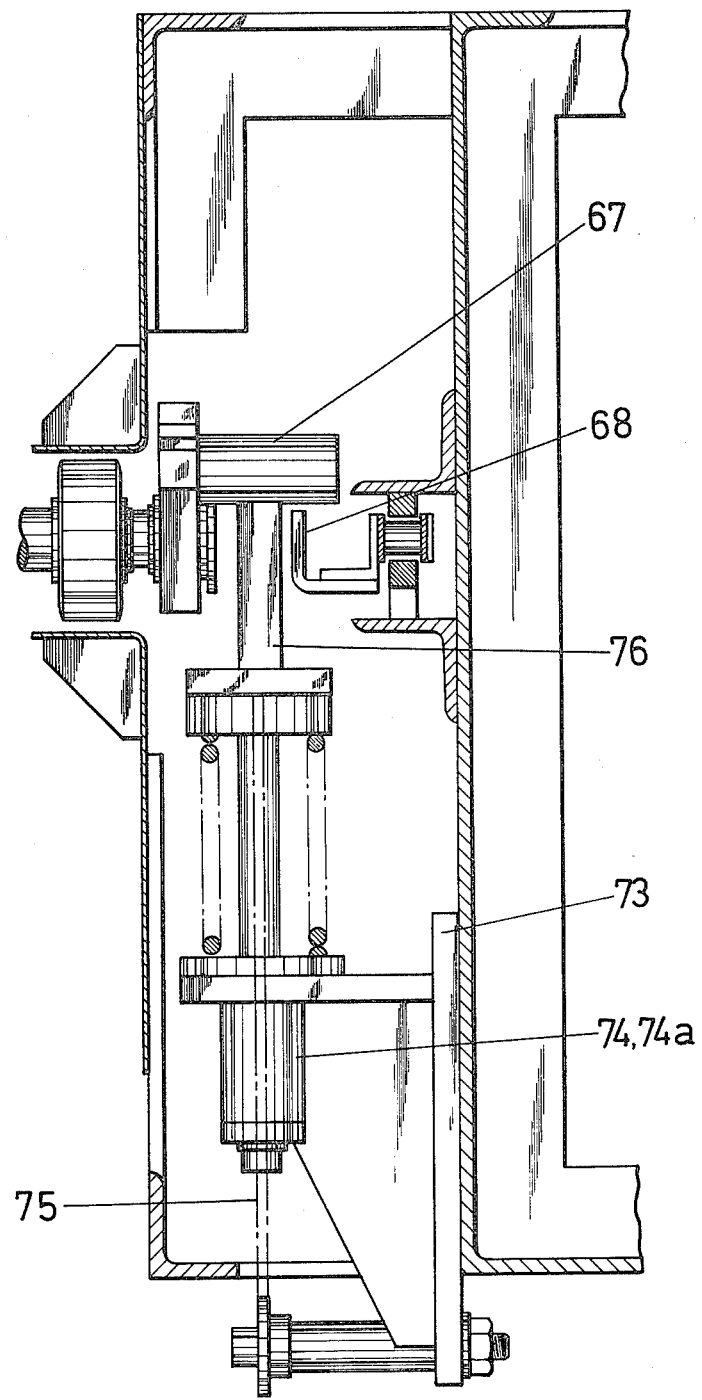
FIG. 10 is a transverse sectional view of the same.

FIGS. 7, 8 and 9 show a workpiece carrier 27 which carries workpieces. The carrier has two pairs of wheels 28 and 28a, and 29 and 29a, which roll on the guide 3 shown in FIG. 1. An enlarged view of the carrier is shown in FIGS. 7 and 8. The carrier has guide pins 30 and 30a extending from the base 27a and serving as a guide when loading the holder. Vertically extending shafts 64 and 64a are secured to the underside of the carrier, and guide wheels 63 and 63a are rotatably mounted on these shafts 64 and 64a. Guide wheels 63 and 63a run in and are guided by guide channel 65 on guide 3. At the lower end of shaft 64 is a cam wheel 66 provided with a downwardly extending pin 67 secured thereto and facing drive pins 68 provided at intervals along the chain 4. The cam wheel 66 is normally held in a drive pin engaging position by a spring 77 connected to shaft 64. Thus, in the normal state, the pin 67 faces a drive pin 68, so that the carrier is driven by the chain 4. Usually, two or three workpiece carriers are sufficient for one complete apparatus, but it is possible to provide a greater number of carriers. A carrier stop means is provided at the carrier stop position. As shown in detail in the left hand portion of FIG. 6, the stop means has a frame 61 mounted above the guide 3. A fluid pressure cylinder 51 is mounted on top of the frame, with the piston rod thereof extending downwardly and supporting carrier positioning stoppers 52 and 52a. Also, a carrier detaching means is provided at the carrier stop position. It is so constructed as to cause the carrier to be detached from the chain and move for a while due to the inertia of the carrier until the carrier is slowed down and stopped by the afore-mentioned carrier positioning stoppers 52 and 52a. As shown in FIGS. 9 and 10, a support 73 is secured to the frame below the guide channel 65, and two bearings 74 and 74a are secured to the support 73. A shoe 76 is secured to the ends of support rods 79 and 79a slidably mounted in the bearings 74 and 74a. The shoe 76 faces the pin 67 secured to the cam wheel 66 of the carrier. As shown in FIGS. 9 and 10, when the support rods 79 and 79a are projected toward the chain 4, the pin 67 which has been driven by a drive pin 68 provided on the chain engages the shoe 76 and is guided by the forward edge of the shoe 76 to move laterally as shown in FIG. 9, so that it is disengaged from the drive pin 68. Thereafter, the carrier advances for a small distance due to its own inertia until it is stopped by the carrier positioning stoppers 52 and 52a. Since the carrier is isolated and is slowed down at this time, neither the carrier nor the stoppers will be damaged by the impact.

Figure 11:
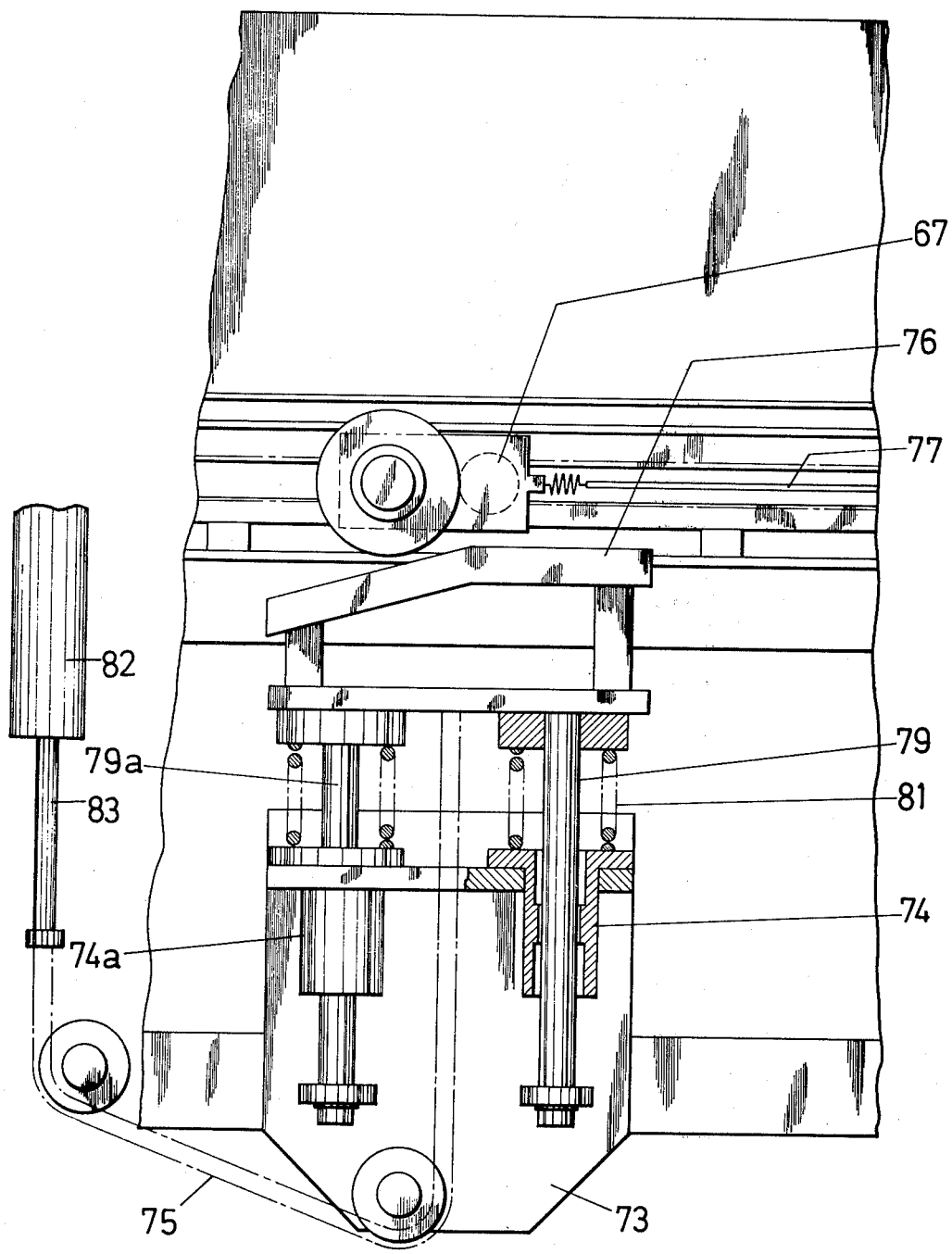
FIG. 11 is a plan view, similar to FIG. 9, showing the details of the means for disengaging the carrier and the chain.
Figure 12:
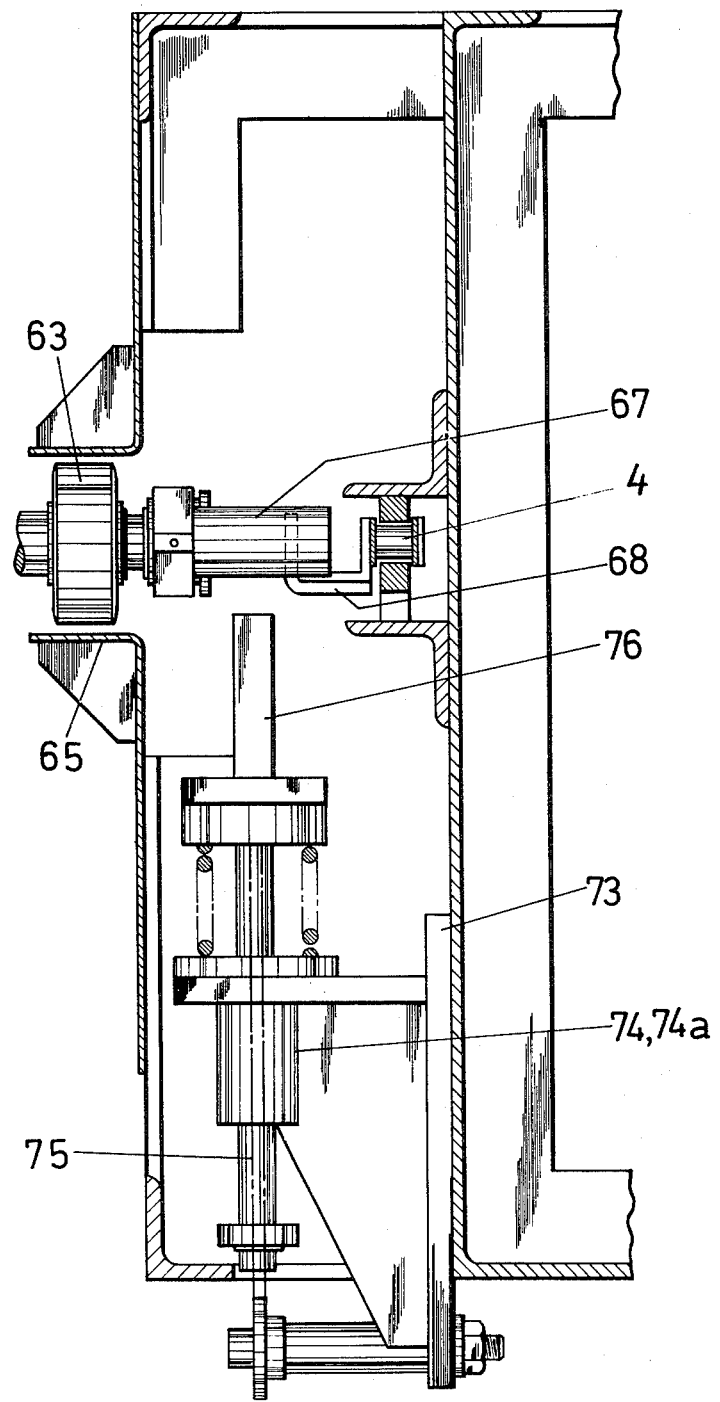
FIG. 12 is a transverse sectional view of the same.

The shoe 76 is adapted to be moved by moving a chain 75 utilizing fluid pressure cylinder. As shown in FIGS. 9 and 11, a chain 75 passed around a suitable number of wheels is connected to a piston rod 83 of a fluid pressure cylinder 82. By withdrawing the piston by fluid pressure the shoe 76 is adapted to be retracted as shown in FIGS. 11 and 12, allowing the pin 67 to be swung into line with pins 68 on chain 4 the action of the spring 77. In this position, the carrier may be driven by one of the drive pins 68 provided on the chain 4 at equal intervals. When the pin 67 clears the shoe 76, a timer deactivates fluid pressure cylinder 82 and the aforementioned rods 79 and 79a are adapted to be projected by the action of springs 81, returning the shoe 76 to the carrier stopping postion. Then, it is ready to stop the next carrier. These carrier detaching means are usually provided at the workpiece supply position 31, workpiece loading position 55 and workpiece unloading position 56, but may be provided in workpiece removing position 62 in order to permit removal of the finished workpieces from the holder. The workpiece removing position can be omitted if the workpieces can be removed at the workpiece supply position 31. Also, if the same operation is possible, the same cylinder may be used both for the workpiece loading position 55 and workpiece unloading position 56. However, it is desirable to provide a separate cylinder for the workpiece supply position 31. In order to stop the reciprocating saddles 14 and 14a at the set position, a magnetic switch 71 is provided on a support 72 as shown in FIG. 5. An iron piece for activating the switch 71 is provided on the cam wheel 18 for intermittent running of the motor after the end of the finishing operation and stopping it upon actuation of this switch 71. The electric circuit for this purpose is shown as an inching circuit in the electric circuit shown in FIG. 34.

Figure 29:
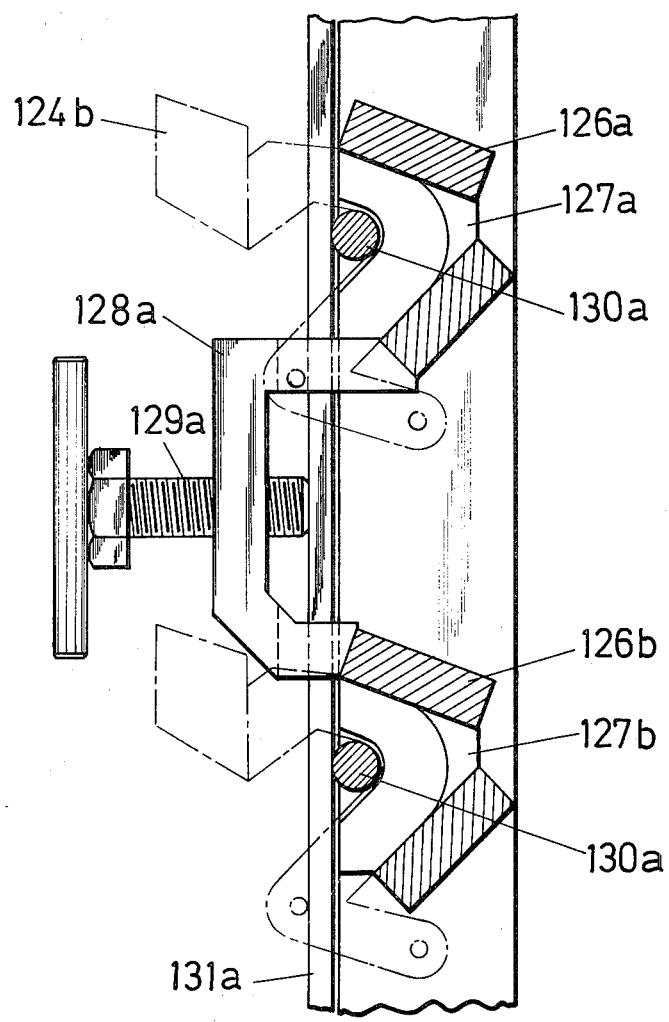
FIG. 29 is a section taken along the line F — F in FIG. 28.
Figure 30:
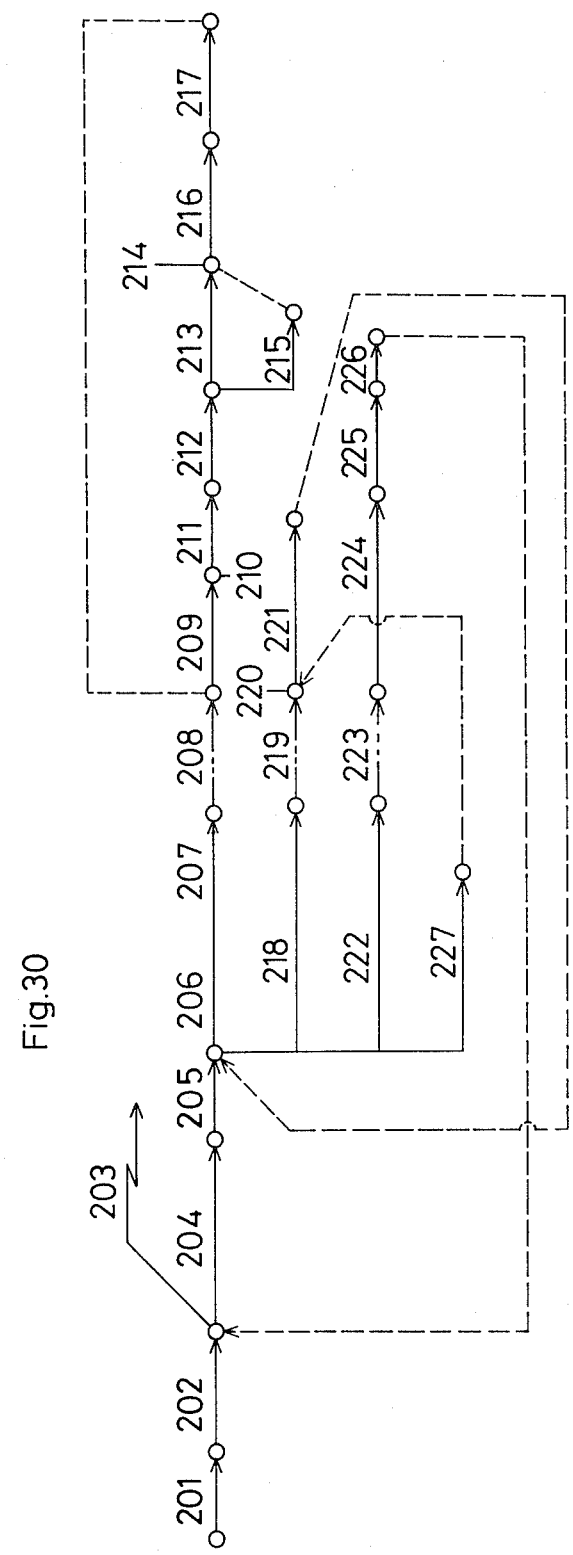
FIG. 30 is a flow diagram showing the sequence of the functional operations according to the invention, in which reference numerals denote as follows, respectively.

The operation of the system according to the invention constituted by the afore-mentioned mechanism will now be described. All the steps in the operation are automated and carried out in a predetermined sequence except for the supplying and removal of the workpieces to and from the holder. There are various methods of effecting the sequence control of the individual steps, for instance by combining timers and relays, by using a sequence programmer, by using a punched tape, and by using a magnetic tape. The example given below makes use of a circuit consisting of relays and timers. The normal operation will first be described, and the start and the end of the operation will be described later. In the normal operating condition, the various fluid pressure sources are in the operative state, and the chain 4 is always in the driven state. A first workpiece carrier 27 is stopped at the workpiece supply position 31 by the action of a carrier detaching means as described above. A loading station carrier is stopped at the loading station 55 in a state in which the loading of the workpieces has been completed. An unloading station carrier is stopped at the unloading station 56 in a state in which it is loaded with finished workpieces (or sometimes without workpieces at the beginning of the operation). The workpiece transfer means is assumed to be in the advanced position, the abrasive trough is in the lower position, and a holder on the abrasive trough is in an unclamped state. These conditions are achieved at the end of the normal working sequence, but it is not so in the case of a power stoppage or in the case of actuating an emergency switch and resuming the operation. It is possible to provide manual switches for the individual steps or to provide a circuit with which the sequence up to the aforementioned state can be caused to proceed by pushing a preparatory run button. The location of limit switches and so forth is shown in FIG. 30, the power source system is shown in FIGS. 32 to 34, and the operational sequence is shown in FIG. 29.

In the first step, the finished workpieces are removed from the holder stopped at the workpiece supply position 31 (the carrier may carry no workpiece at the beginning of the operation), and unfinished workpieces are loaded. This loading is detected by a limit switch LS1, whereby positioning stoppers at individual stopping positions are withdrawn and the shoe 76 is retracted. Then, the carrier starts to move and is subsequently stopped at the next stop position. During this time, the workpieces on the carrier on the unloading side, if any, may undergo such after-treatments as washing with water, anticorrosive treatment and blowing with steam. The stop position of the carrier is detected by limit switches LS2 and LS3, whereby the workpiece transfer means is moved to transfer the workpiece holder on the loading side carrier to the finishing apparatus, and the holder on the abrasive trough onto the carrier at the unloading position 56, and the presence of the workpiece on the unloading portion is confirmed by a limit switch LS4. The workpieces are clamped by workpiece clamping cylinder 16 while advancing the workpiece transfer means and moving the carriers.

Then, the reciprocating motor 20 is started to cause reciprocation of the workpieces, while at the same time lifting the trough 7. The finishing time during which the compound solution is poured is determined by a timer T1. After the predetermined time has elapsed, the abrasive trough is lowered, and the reciprocation of the workpieces is stopped. At this time, the reciprocating motor is intermittently rotated by means of timers and is stopped at a predetermined position by a magnetic switch 71 (LS20). Thereafter, the clamp is released to render the workpieces in a state ready for unloading. This state is the same as the afore-mentioned initial state, and thereafter the above sequence is repeated.

In the preceding embodiment, the chain 4 and the drive pin 68 are adopted as the drive means, but this is by no means limiting, and it is also possible to adopt other known carrier drive means such as ropes and wires. Also, instead of eccentrically providing a pin as the engaging member on the rotor for engagement and disengagement with respect to the afore-mentioned projection by rotating the rotor, various other constructions can be used, for instance one where a pin may be provided on the underside of the carrier such that it is movable only in the direction at right angles to the direction of advancement and may be normally tensioned by a spring to maintain a contact position and may be moved in the direction of detaching from the projection of the drive means only when it is brought into engagement with the guide, or one where a hook of the carrier may be anchored to an annular member of the drive means and it may be detached before the stop position. In general, it is only necesary that it be possible to release the engagement between the carrier and the drive means before the carrier stop position. Further, impact with the stopper may be relieved by arrangement of the device so as to increase the friction when the carrier is moving due to its inertia.

As has been described, according to the invention the carrier 27 is detached from the drive means in the vicinity of the stop position so that it proceeds up to the stop position due to its inertia. It is not only possible to reduce speed without requiring any special motor for the deceleration, but it is also possible to substantially eliminate the shock at the time of the stopping by appropriately selecting the position and the length of the guide 76. Further, according to the invention the mechanism for starting the operation can be remarkably simplified.

Figure 13:
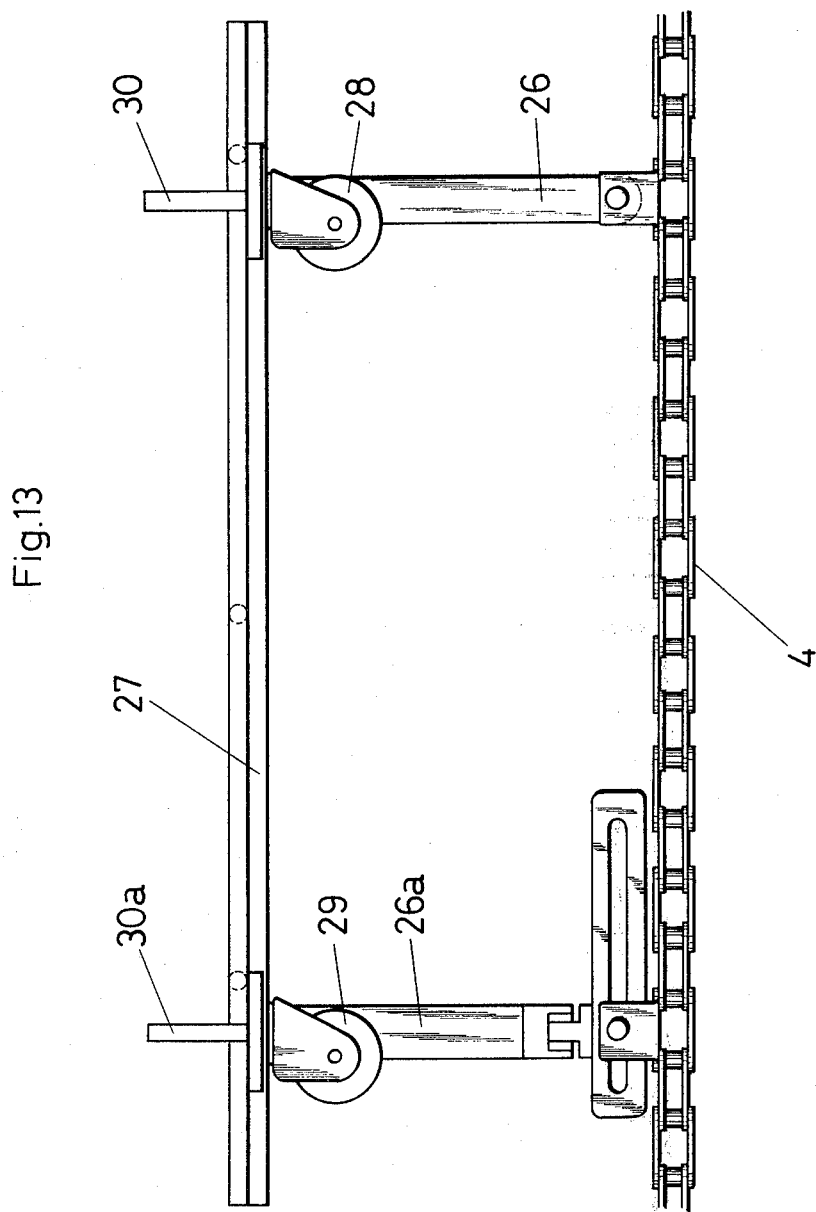
FIG. 13 is a front view of a mechanism in which the carrier and the chain are fixed.
Figure 14:
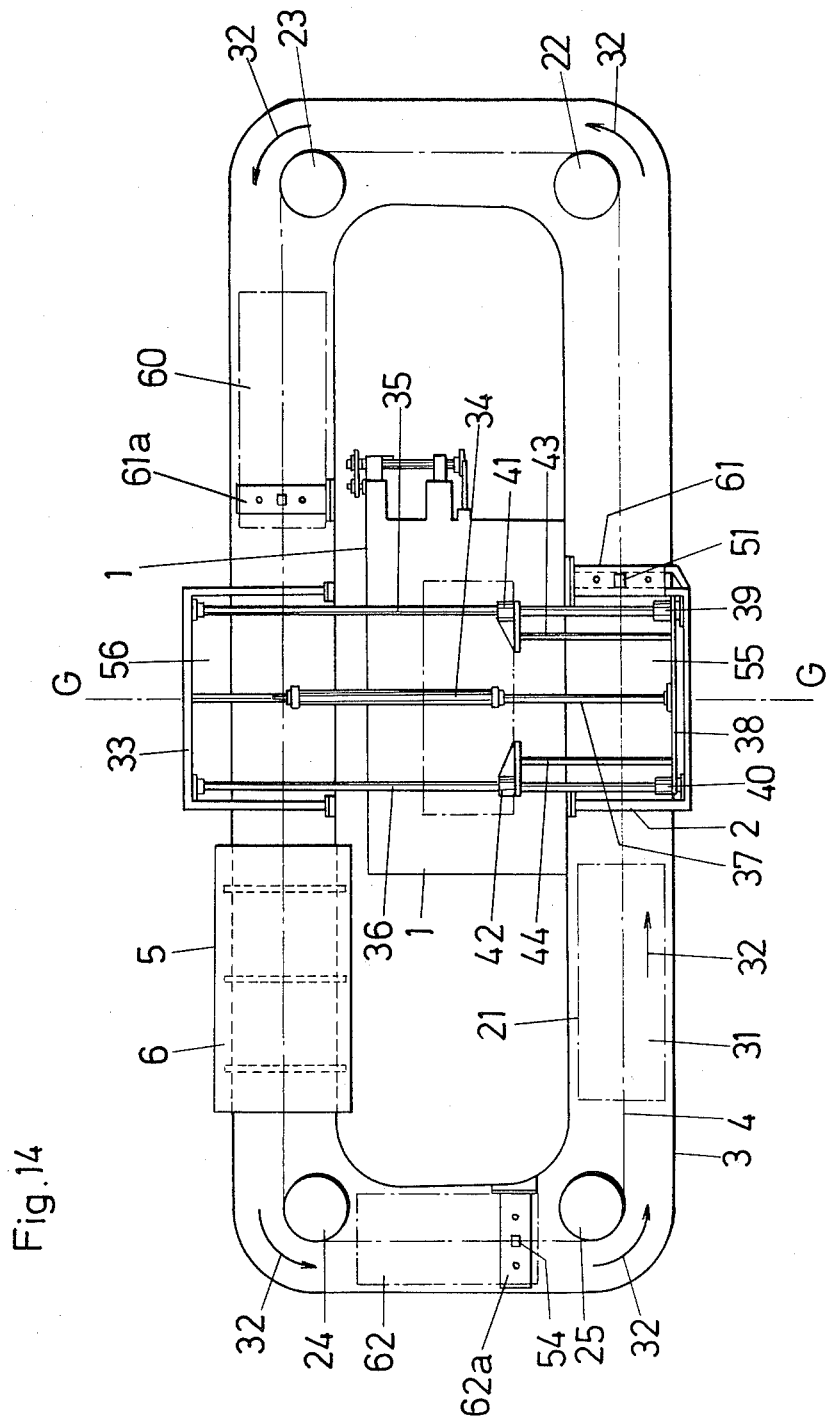
FIG. 14 is a plan view of the machine according to the invention in which the carrier and the chain are fixed.

As described above, the carrier is engageable and disengageable with the chain at any desired position by providing the mechanism for engagement and disengagement between the carrier and the chain. However, this necessarily complicates the structure thus involving higher costs of manufacturing. In order to eliminate this disadvantage, the carrier and the chain may be fixed to each other as shown in FIG. 13. In this manner, a simplified and less expensive structure of the mechanism may be obtained, but this makes it impossible to stop the carrier at a desired position, necessarily elongating the passage of the carrier. In other words, in order to obtain the same performances as with the mechanism of FIG. 1, it is necessary that the distance from the workpiece loading position 55 to the workpiece unloading position 56, and the distance from the position 56 to the position 55, be equal. This means that, as shown in FIG. 14, the opposite sides of the finishing machine must be symmetrical with respect to the central line G — G of the machine.

However, since there are provided a washing and anti-corrosive treatment unit, steam blower and the like on the left side of the line G — G, the right side can be shortened in the embodiment of FIG. 1. On the contrary, without provision of the means for engaging and disengaging the carrier and the chain, there is necessarily an elongated passage of the carrier as shown in FIG. 14. However, this presents an advantage when such mechanism is preferably simplified and is used on the floor of a spacious factory.

Figure 15:
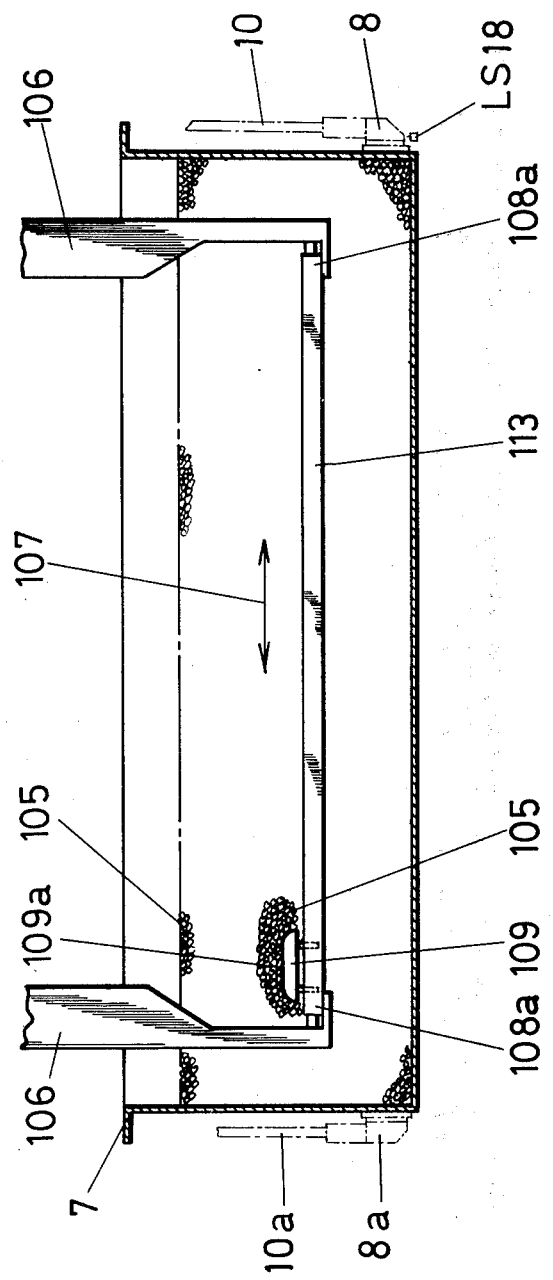
FIG. 15 is a view partly in section showing the abrasive trough in the upper position and a holder plunged in the abrasive.

Now, the description will be made of the holder according to the invention. When the abrasive trough 7 is on the floor and filled with the abrasive chips 105 as shown in FIG. 15, the lowermost position of the trough 7 is detected by a limit switch LS18, while its uppermost position is detected by a limit switch LS14 (see FIG. 5). During the lifting of the abrasive trough 7 the workpiece holder secured to a chucking head 106 readily proceeds into the layer in the abrasive trough 105 while executing the reciprocal driving as shown by the arrow 107 in FIG. 15, whereby the surfaces of the workpieces are finished.

Figure 16:
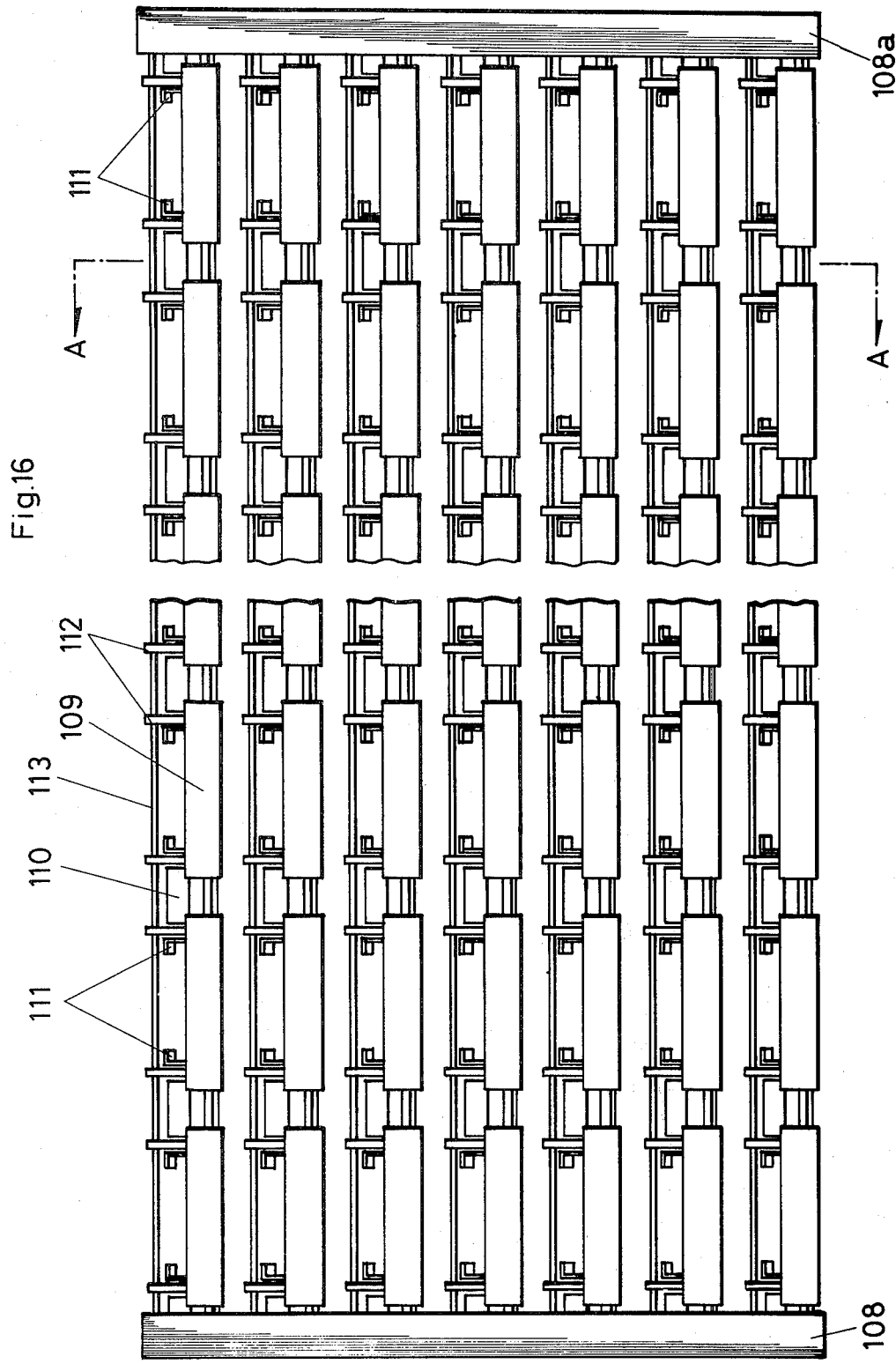
FIG. 16 is a plan view, on an enlarged scale, showing an example of the holder, on which automobile door handles are mounted.
Figure 17:
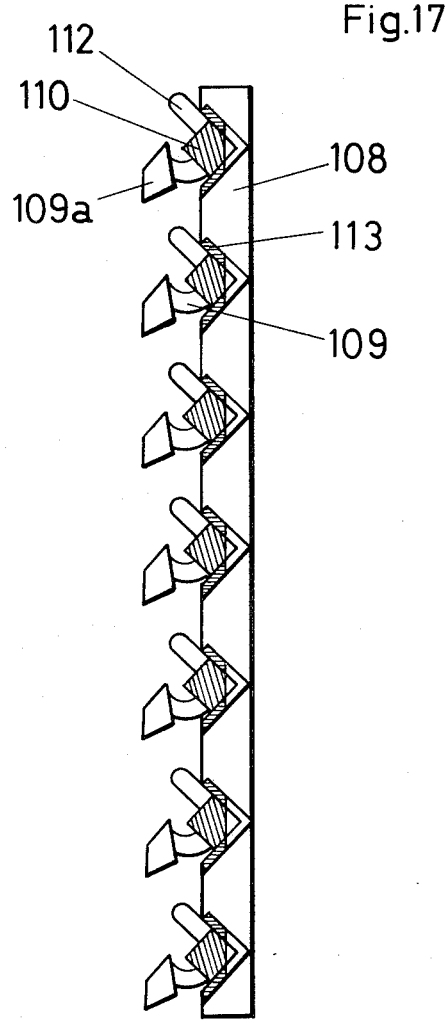
FIG. 17 is a section taken along the line A — A in FIG. 16.
Figure 21:
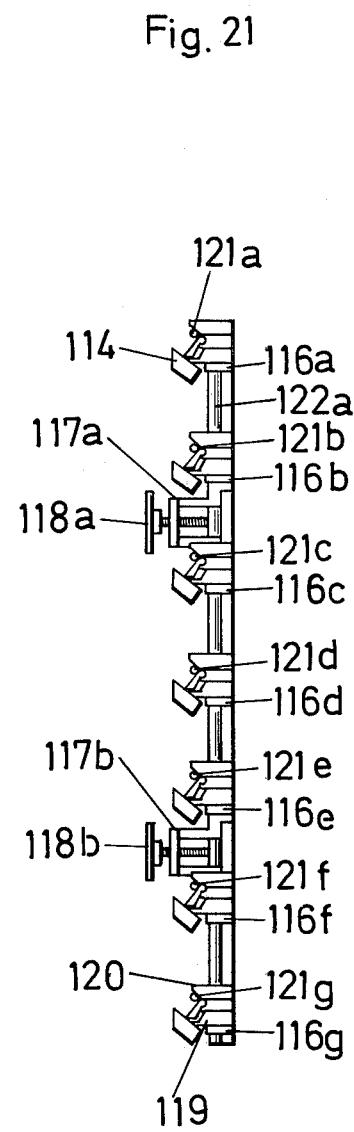
FIG. 21 is a view in the direction of arrow C — C in FIG. 20.
Figure 19:
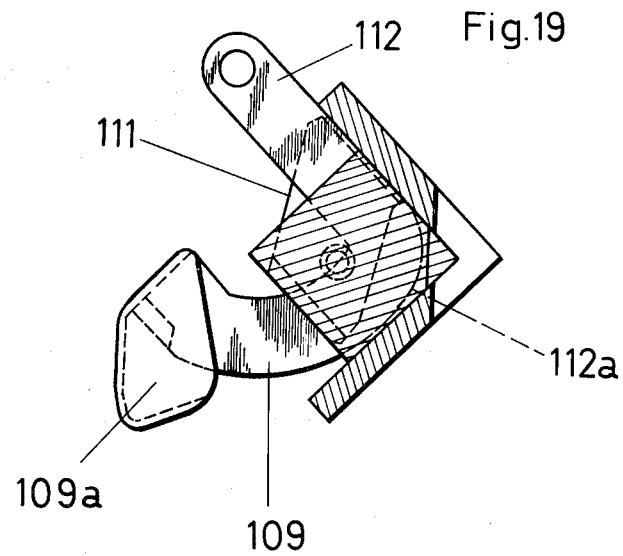
FIG. 19 is a section taken along the line B — B in FIG. 18.
Figure 27:
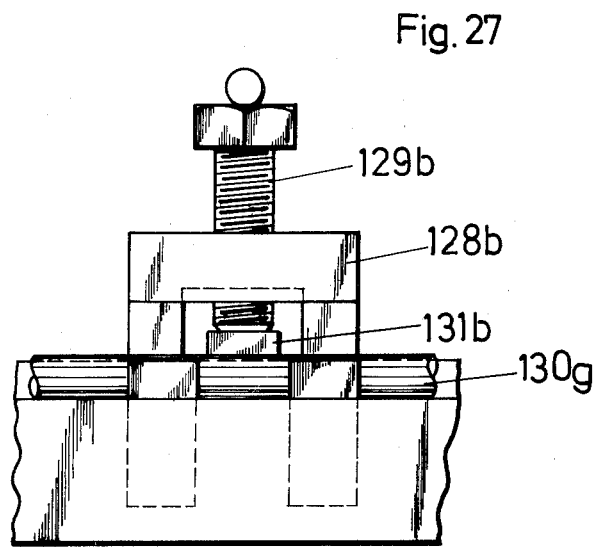
FIG. 27 is a view, on an enlarged scale, viewed in the direction of arrow E — E in FIG. 25.
Figure 22:
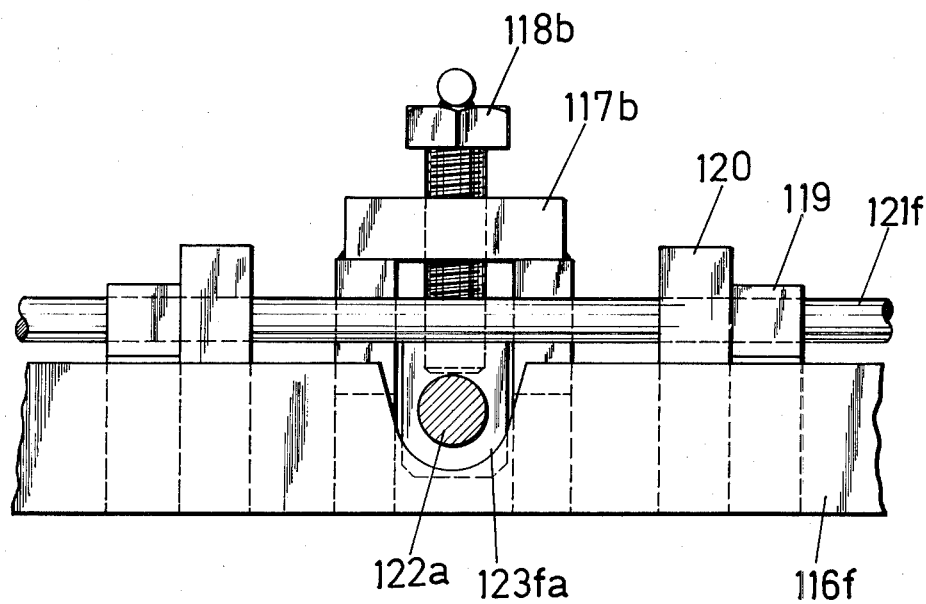
FIG. 22 is a view, on an enlarged scale, in the direction of arrow D — D in FIG. 20.

Since the holder includes angle-shaped members 113 for holding workpieces 109 within the frames 108 and 108a thereof as shown in FIG. 16, members 113 being arranged parallel to the direction of the reciprocating motion as indicated by arrow 107 in FIG. 15, workpieces 109 can be individually and securely mounted on the members 113 by inserting the bent portion 112a of legs 112 of the workpieces into the angle-shaped portions of the members 113 so that the bent portion may be resiliently held between the fixed blocks 110 and the plate springs 111.

Workpieces 109 are securely placed in the holder with the finishing surfaces 109a up and are buried to a depth of the abrasive chips 105 ranging from 100 mm to 250 mm or preferably 150 mm to 200 mm, so that the surfaces of the workpieces are entirely covered with the abrasive chips 105 as shown at 109a in FIG. 15, and are subject to pressure due to the weight of the chips. Thus, when the workpieces execute reciprocation in the direction of arrow 107 at a suitable speed, the abrasive chips always closely cover the workpiece surfaces to be finished and the chips and workpieces rub each other without substantially forming any void between them. With this arrangement, the workpieces can be uniformly finished for planar, convexed, concaved, or inclined surfaces unless these surfaces are extremely unique forms. With the holder in which the workpieces are fixed with the surfaces to be finished directed upwardly, there is no possibility of resulting in irregular finishing due to insufficient abrasive in close contact with the surfaces to be finished, so that it is possible to set the workpieces very close to one another. For example, at least 3 to 5 times the number of workpieces can be fixed as compared with the case of the prior-art arrangement of workpieces with surfaces to be finished directed downwardly, thereby reducing the finishing time to one half, and also finished surfaces of excellent precision heretofore unavailable can be obtained.

Figure 23:
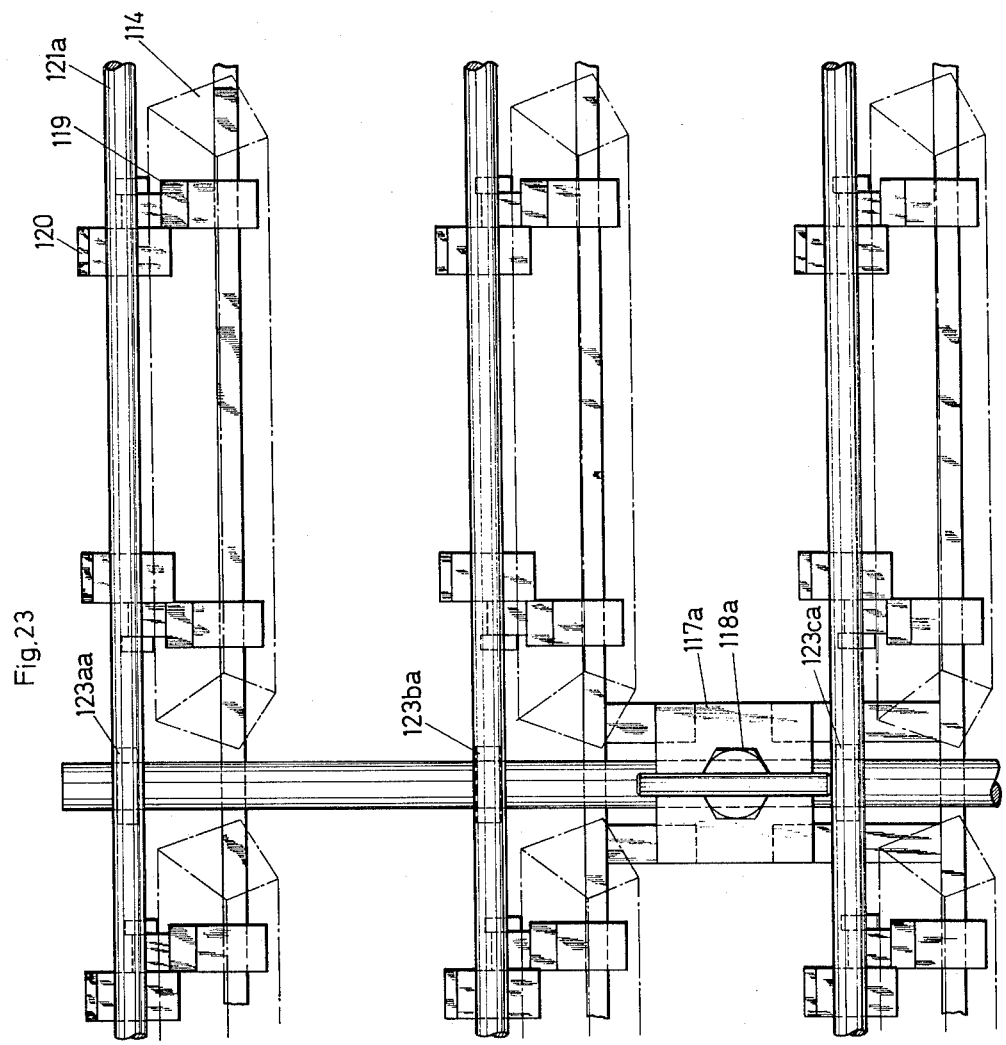
FIG. 23 shows, on an enlarged scale, part of FIG. 20.
Figure 24:
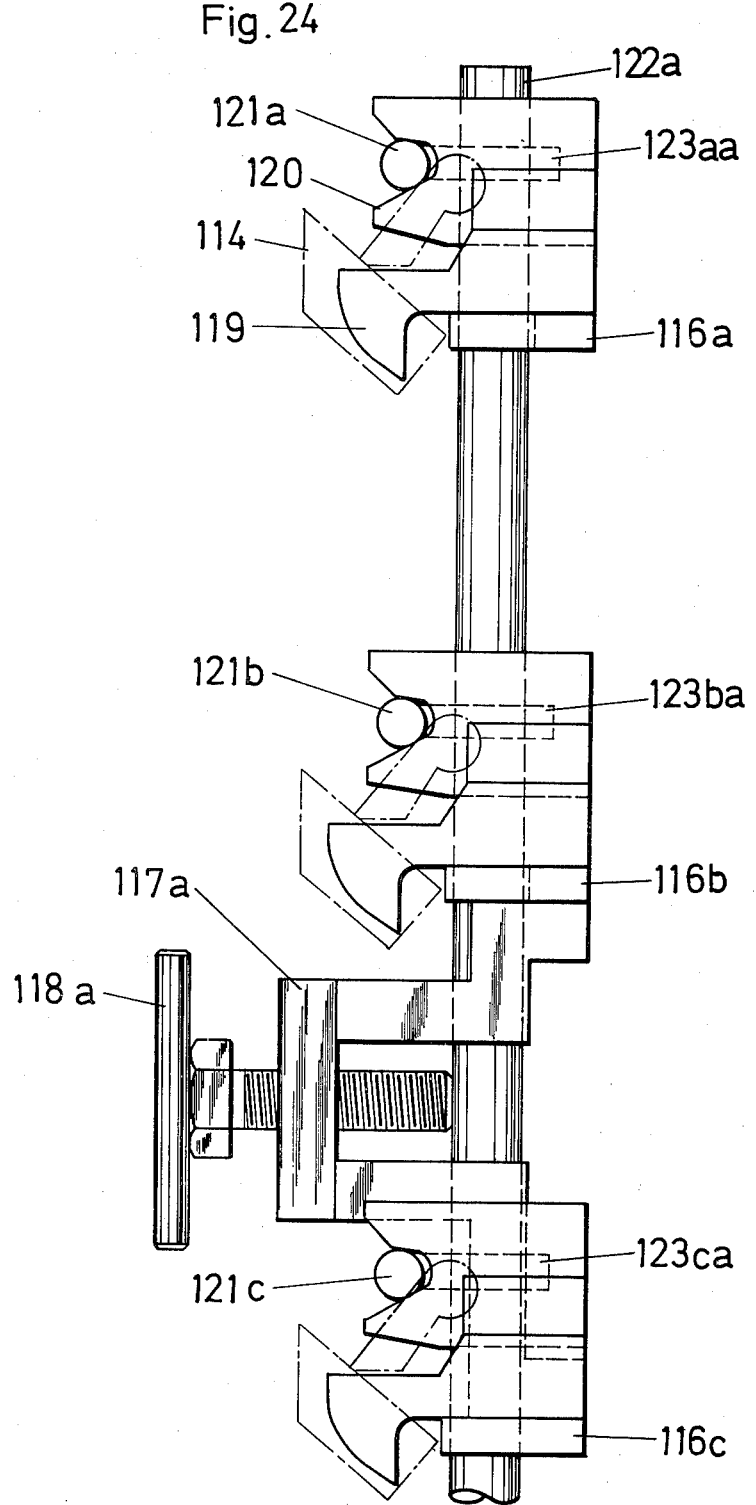
FIG. 24 is a side view of FIG. 23.
Figure 25:
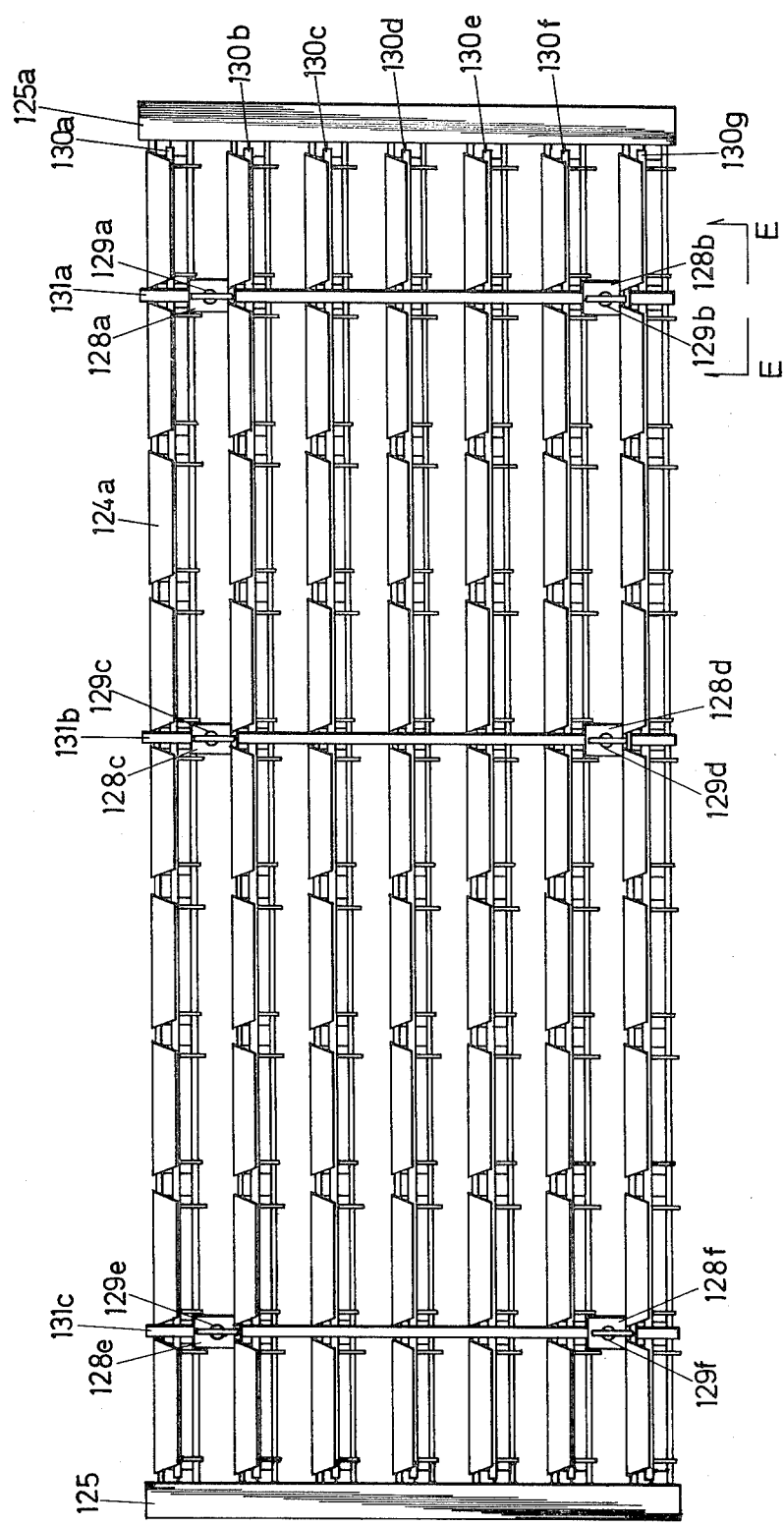
FIG. 25 is a plan view, on an enlarged scale, showing a further example of the holder.
Figure 26:
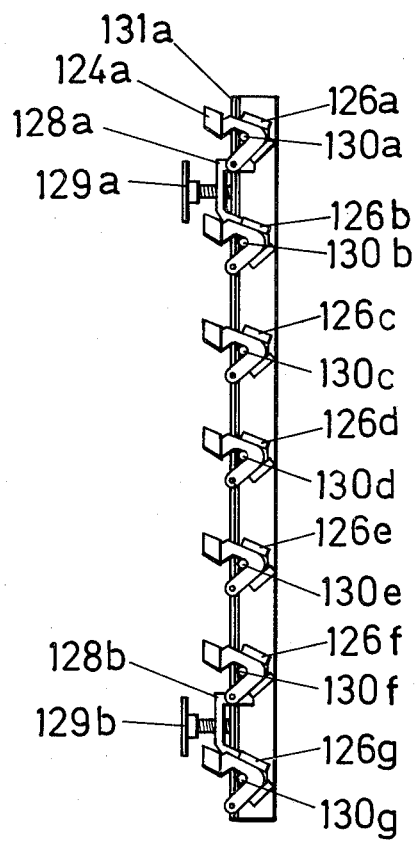
FIG. 26 is a side view of the same.
Figure 28:
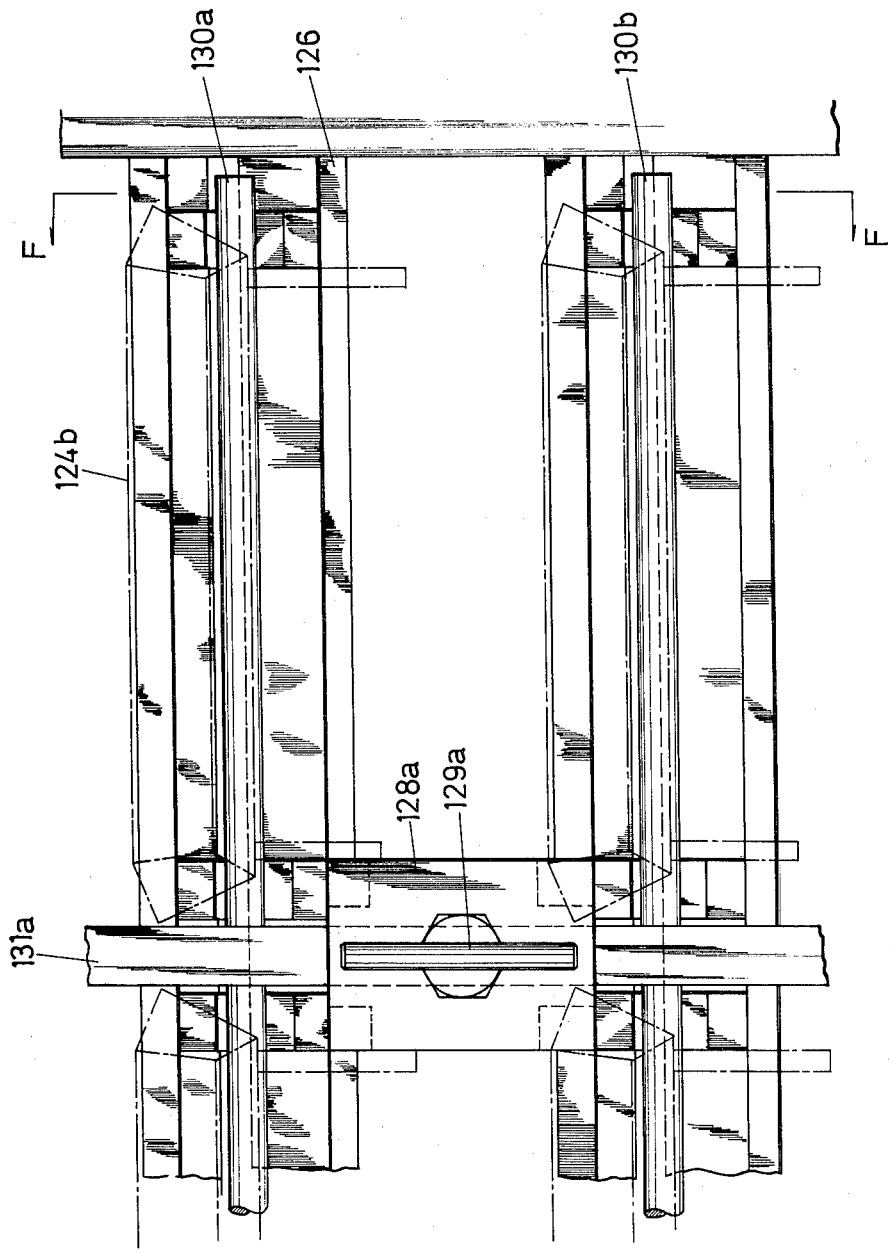
FIG. 28 is an enlarged view of a part of FIG. 25.

Another example of the holder according to the invention will now be described with reference to the drawings. FIGS. 20 to 24 show an example applied to workpieces having straight legs as shown at 114. As is shown, a number of workpiece frames 116a, 116b, . . ., 116g are arranged in a plurality of parallel rows and substantially at equal intervals between a pair of holder frames 115 and 115a. Brackets 117a, 117b, . . . , 117f are secured to the workpiece frame at several positions, each bracket has a screw hole with clamp screws 118a, 118b, . . . , 118f. Also, the workpiece frame has a plurality of workpiece bases 119 for mounting workpieces. Further, fixing rod guides 120 are secured for receiving the workpieces. FIGS. 23 and 24 show the detailed construction. The top of the fixing guide 120 is provided with a saddle portion for accommodating fixing rods 121a, 121b, . . . , 121g. When the workpieces 114 are mounted on the workpiece bases 119 as is shown, the fixing rod 121a fixes the leg of the workpiece. The fixing rods 121a, 121b, . . . , 121g are provided with projections 123aa, 123ab, 123ac, 123ba, . . . , 123gc at positions of intersections with fixing rods 122a, 122b and 122c. In these symbols, a in the first place indicates positions on the fixing rods 121, and a in the next place indicates position of intersection with the fixing rod 122. The projections have holes, through which the fixing rods 122a, 122b and 122c can be passed.

Workpieces are placed on the respective workpiece bases as shown in FIG. 20, and their legs are fixed by the fixing rods 121a, 121b, . . . , 121g. Further, keep rods are passed through holes provided in projections, and the lower portions of the screws are passed through the brackets 117a, 117b, . . . , 117f. Then, by fastening the clamp screws 118a, 118b, . . . , 118f, the clamp screws push down the fixing rods to fix the workpieces. When taking out the workpieces after the end of treatment, the clamp screws 118a, 118b, . . . , 118f are loosened, and the keep rods 122a, 122b and 122c are removed. Then, by removing the fixing rods 121a, 121b, . . . , 121g, the workpieces can readily removed from the holder.

Another example of the holder according to the invention will now be described in connection with the drawings. FIGS. 25 to 28 show an example applied to workpieces having curved legs as shown at 124a and 124b. As shown in the figure, a number of workpiece frames 126a, 126b, . . . , 127f are fixed in a plurality of parallel rows and substantially at equal intervals between pair holder frames 125 and 125a. if necessary, the workpiece frame may be provided with V-shaped blocks 127a and 127b so that the workpiece bottom may be held in close contact, as shown in FIG. 29, thus ensuring reliable fixing of the workpieces. Further, brackets 128a, 128b, . . . , 128f are secured to the workpiece frame at several positions, with screw holes provided in the top of the individual brackets and clamp screws 129a, 129b, . . . , 129f serewed in these holes. When the workpieces are arranged in parallel on the workpiece frames 126a, 126b, . . . ,126g, fixing rods 130a, 130b, . . . , 130g are passed between legs of the workpieces, and then keep plates 131a, 131b, and 131c are passed between the brackets 128a, 128b, . . . , 128f for fixing the keep plates 131a, 131b and 131c. By these structures, all the workpieces are fixed to the workpiece frames by the fixing rods 130a, 130b, . . . , 130g. In order to remove the workpieces after the end of the treatment, the clamp screws 129a, 129b, . . . , 129f are loosened and the keep plates 131a, 131b and 131c are removed. Then, by removing the fixing rods 130a, 130b, . . . , 130f the workpieces can be readily removed from the holder.

As has been described in detail, according to the invention a number of workpieces are fixed by a plurality of fixing rods and keep plates, so that they can be readily loaded and removed. Also, they will never be detected during various processes.

What is claimed is:

1. An automatic reciprocating finishing machine for finishing surfaces of workpieces, said machine comprising:

an endless conveyor guide having two parallel passage sections;

an endless chain movably mounted around said conveyor guide;

at least two workpiece carriers for positioning thereon a workpiece, said carriers being mounted for movement about said conveyor guide;

a finishing apparatus positioned between said two parallel passage sections, said finishing apparatus including a trough filled with finishing material, said trough being vertically movable from a lower inoperative position to an upper finishing position, said means to reciprocate workpieces positioned in said finishing apparatus in a horizontal direction within said trough when said trough is in said upper finishing position;

means for automatically operatively connecting said workpiece carriers to said endless chain, whereby said workpiece carriers are moved along said conveyor guide by said endless chain, and for automatically interrupting such connection at predetermined locations about said conveyor guide; and means for automatically transferring workpieces from one of said workpiece carriers to said finishing apparatus and from said finishing apparatus to another of said workpiece carriers at at least two of said predetermined locations about said conveyor guide.

2. A machine as claimed in claim 1, wherein said conveyor guide has a substantially rectangular configuration, said two parallel passage sections forming two opposite sides of said rectangular configuration, said predetermined locations including a loading position midway of a first of said passage sections and an unloading position midway of a second of said passage sections, and said transferring means transfers workpieces from said loading position to said finishing apparatus and from and finishing apparatus to said unloading position in a direction transverse to said passage sections.

3. A machine as claimed in claim 1, further comprising washing means, corrosion preventing treatment means, and steam drying means positioned about said conveyor guide for treating workpieces finished in said finishing apparatus.

4. A machine as claimed in claim 1, further comprising means positioned at said predetermined locations for stopping movement of said workpiece carriers after connection between said workpiece carriers and said endless chain is interrupted.

5. A machine as claimed in claim 1, further comprising workpiece holder means positioned on said workpiece carriers for securely holding said workpieces.

6. A machine as claimed in claim 5, wherein said workpiece holder means comprises a substantially rectangular frame, a plurality of parallelly positioned angle-shaped members mounted on said frame, and a plurality of fixing blocks attached to said members for attaching workpieces thereto.

* * * * *